United States Patent
Namikata et al.

(10) Patent No.: US 8,320,019 B2
(45) Date of Patent: Nov. 27, 2012

(54) IMAGE PROCESSING APPARATUS, IMAGE PROCESSING METHOD, AND COMPUTER PROGRAM THEREOF

(75) Inventors: Takeshi Namikata, Yokohama (JP); Tsutomu Sakaue, Yokohama (JP); Manabu Takebayashi, Isehara (JP); Reiji Misawa, Tokyo (JP); Osamu Iinuma, Machida (JP); Naoki Ito, Tokyo (JP); Yoichi Kashibuchi, Tokyo (JP); Junya Arakawa, Kawasaki (JP); Shinji Sano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 12/496,601

(22) Filed: Jul. 1, 2009
(Under 37 CFR 1.47)

(65) Prior Publication Data

US 2010/0171999 A1 Jul. 8, 2010

(30) Foreign Application Priority Data

Jul. 9, 2008 (JP) .................. 2008-179204

(51) Int. Cl.
*H04N 1/40* (2006.01)
(52) U.S. Cl. ........................ 358/2.1; 358/462
(58) Field of Classification Search .................... 358/1.2, 358/1.9, 2.1, 462, 468, 470; 382/176–180, 382/290, 292
See application file for complete search history.

(56) References Cited

U.S. PATENT DOCUMENTS

| | | | |
|---|---|---|---|
| 5,907,835 A | 5/1999 | Yokomizo et al. | |
| 6,928,190 B2 | 8/2005 | Namikata | |
| 7,990,569 B2 * | 8/2011 | Hino | 358/1.2 |
| 2005/0105148 A1 | 5/2005 | Misawa | |

FOREIGN PATENT DOCUMENTS

| | | |
|---|---|---|
| JP | 8-147446 | 6/1996 |
| JP | 10-228473 A | 8/1998 |
| JP | 2004-078531 A | 3/2004 |
| JP | 2006-120125 A | 5/2006 |

OTHER PUBLICATIONS

Japanese Office Action dated Jun. 26, 2012 in Japanese Application No. 2008-179204.
Hirano, et al. "A Method of Logical Contents Extraction from Documents and Drawings Based on the Analysis of Page Description Language", vol. JP1-D, No. 5, pp. 1406-1417, Aug. 1, 2008.

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

There are cases in which an effective search index cannot be provided to an image data only by extracting character codes from a character object in PDL data. An image processing apparatus of the present invention obtains image data by rendering PDL data, and extracts a character object from the image data. The image processing apparatus performs character recognition processing on the extracted character object to obtain character code information, and provides metadata including the character code information to the image data.

7 Claims, 32 Drawing Sheets

```
<?xml version="1.0"?>
<svg:svg xmlns:svg="http://www.w3.org/2000/svg" xmlns:xlink="http://www.w3.org/1999/xlink" xmlns:rcd
="http://www.canon.com/ns/rcd" width="606" height="862" viewBox="0 0 2361 3388">
```

```
<svg:image x="0" y="0" width="1240" height="1760"
xlink:href="data:image/jpeg;base64,/9j/2wCEAB8VFxsXEx8bGRsjIR8kLk0yLioqLJ5DRzhNb2J1c21ibGp7irGWe4OnhGpsmtGcp7a8
xsjGd5TZ6NfA5rHCxr4BISMjLiguWjlyWr5/bH++vr6+vr6+vr6+vr6+vr6+vr6+
      :
      :
FFABRQB//ZAAA=">
</svg:image>
```
— 901

```
<svg:svg x="188" y="284" width="896" height="148" rcd:gType="stringText">
    <svg:text fill="#020202" font-size="150">
        <svg:tspan y="144" x="0 149 299 449 609 750">TARO YAMADA</svg:tspan>
    </svg:text>
</svg:svg>
```
— 902

```
<svg:svg x="188" y="284" width="896" height="148" rcd:gType="vectorText">
    <svg:g fill="#020202">
        <path d="        M123.3,779h1.2c2.4,0 10.7,3.1 10.7,4v12h1.4q1.4,0 3.8,-1q2.4,-1 8.6,-4h1c3.5,0 8,2.8 8,5
        v2q-14,2 -20,2v3q0,3 2,6.6v2.4h2q2,0 6.9,-1.5q5,-1.5 12.1,-4.5h0.5c3.3,0 9.5,3.3 9.5,5
        c0,0.8 -23.6,6 -27,6h-1v3q7,22 7,23c0,0.8 -3.2,4 -4,4c-3.1,0 -4.9,-3.4 -6.8,-12.3c-1.4,-7 -2,-9.4 -3,-11.7
        q-0.2,-0.4 -0.2,-0.7v-2.4h-2q-2,0 -7.5,2.3q-5.5,2.2 -13,5.7c-3.2,0 -9.5,-6.7 -9.5,-10v-2h3
        q3.1,2.4 4.1,3.2q0.9,0.8 1.9,0.8c4,0 21,-5.7 21,-7q-2,-5 -2,-9v-1h-3q-3,0 -6.1,1.3q-3.2,1.3 -8.9,3.7
        h-0.5c-3.4,0 -9.5,-5.1 -9.5,-8c0,-1 1.3,-3 2,-3q3,3 5,3h4q10,-2 14,-2v-2.5c0,-3.8 -3.8,-10.5 -6,-10.5
        h-3v-1.5c0,-0.3 3,-3.5 3.3,-3.5z"/>
        <path d="        M199,78lh1c2.4,0 9.6,2.2 9.6,3v15h3.2q3,2.0 11.1,-2q7.8,-2 16.1,-5c2.2,0 8,5.8 8,8v2
        h-5q0,0 0,0c-1,2.7 -23.2,18 -26,18h-1v2.5q5,18.5 5,21v0.5c0,1.2 -2.1,4 -3,4c-4.1,0 -5.2,-1.9 -6.8,-12.8
        c-2.1,-14.2 -3.6,-22.2 -5,-26.2q-0.2,-0.4 -0.2,-0.7v-2.4h-1.5q-1.5,0 -7.6,2.3q-6.2,2.3 -10.9,4.7c-2.9,0 -8,-6.1 -8,-
9.5
        v-2.5h2q3.1,2.4 4.1,3.2q0.9,0.8 1.9,0.8q12,-3 18,-3v-3c0,-6.7 -3.4,-13 -7,-13h-2v-2
        c0,-1 2.7,-3 4,-3m34,19c-4,0 -21,4.9 -21,6q2,2,11h1.5c1.9,0 17.5,-14.2 17.5,-16v-1z"/>
          :
          :
    </svg:g>
</svg:svg>
```
— 903

```
<svg:svg x="193" y="631" width="311" height="205" rcd:gType="vectorLineArt">
    <svg:path fill="none" stroke="#000000" stroke-width="1.0" stroke-linecap="square"
        d="M1724,2367c-5.5,0 -15.2,12.3 -27,34c-8.2,15 -15,17.2 -79.1,24.5c-37.4,4.3 -63.9,10.1 -63.9,14q0,0.3 0.2,0.4c2.2,1.6
2.5,2.1 3.6,4.5
        c1.3,3.3 1.9,3.6 6.2,3.6h2q2,0 3.5,2c0,3.0 1.5,-1.2 1.5,-1.5c0,-0.3 3.1,-1.5 4,-1.5q2,0 2.5,0.5q0.5,0.5 7.5,5.5
        h12c5.7,0 13,6.7 13,12c0,10.5 -16.3,23 -30,23q-4,0 -6.6,-1.5q-2.7,-1.5 -12.4,-10.5q-7,4 -9.5,4c-4.2,0 -12.3,-6.6 -
12.3,-10
        v-11h-3.2c-5.4,0 -20,27.7 -20,38c0,2.8 3.6,5 8,5h140c4.9,0 12,-4.2 12,-7q0,-1 -3,-6
        v-3.5c0,-22.1 30.5,-49.5 55,-49.5q2.3,0 41,1.6q5,0.2 13.5,2.4q3.5,0 8.5,-2c23,2,0 54,27.9 54,49q0,4 -0.5,4.4
        q-0.5,0.3 -3.5,5.1c0,1.6 6.4,4.5 10,4.5h3.5c36,0 68.5,-5.7 68.5,-12c0,-31.1 -17.8,-49.1 -64,-64.5q-25.1,-8.4 -30.4,-
12.5
        <       q-6.1,-4.8 -16.1,-24c-6.5,-12.5 -15.6,-21 -22.5,-21h-66v0z"/>
          :
</svg:svg>
</svg:svg>
```
— 904

FIG.9

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | PRESENT |
| BLOCK 2 | 3 | X2 | Y2 | W2 | H2 | PRESENT |
| BLOCK 3 | 2 | X3 | Y3 | W3 | H3 | NOT PRESENT |
| BLOCK 4 | 1 | X4 | Y4 | W4 | H4 | PRESENT |
| BLOCK 5 | 3 | X5 | Y5 | W5 | H5 | PRESENT |
| BLOCK 6 | 2 | X6 | Y6 | W6 | H6 | NOT PRESENT |

*ATTRIBUTE 1: CHARACTER 2: PHOTOGRAPH 3: GRAPHIC

INPUT FILE INFORMATION

| TOTAL NUMBER OF BLOCKS | N (=6) |
|---|---|

FIG.11

IMAGE PROCESSING APPARATUS, IMAGE PROCESSING METHOD, AND COMPUTER PROGRAM THEREOF

BACKGROUND OF THE INVENTION

1. Field of the Invention

The present invention relates to an image processing apparatus, especially to an image processing apparatus which divides an image data into drawing elements (objects), extracts metadata, most of which are character information, from the divided drawing elements, and stores the character information after associating the character information with corresponding drawing element.

2. Description of the Related Art

In recent years, a digital multi function peripheral (hereinafter abbreviated as MFP) has become able to have a large capacity HDD. Conventionally, the MFP has a copy function, a PDL print function, a FAX function, a scanned image transmitting function, and so on. By mounting a large capacity HDD, the MFP has become able to provide a so-called BOX function in addition to these functions. The BOX function is a function to store and accumulate image data obtained by scanning an original document and image data rendered for print into a HDD in the MFP. In this way, a user can use the MFP as if it is an image filing apparatus.

The user can perform various operations such as transmitting the image data stored by using the BOX function, printing the image data, or combining the image data with other image to output. In this case, for the convenience of the user, it is necessary to efficiently search for a desired image data. Therefore, a technique which provides character information extracted from image data to the image data as a search index for the search and utilizes it to improve searchability is developed.

The above related art aims mainly at a scanned image data. In a process flow of the related art, first, an area considered to be a character block is cut out as a character area from an image data obtained by scanning an original document. An OCR (Optical Character Recognition) processing is performed on an image data in the character area obtained in this way. Character codes obtained by this OCR processing (character recognition processing) are stored as character information for the search along with the original image.

On the other hand, there is a related art in which a document created by an application on a computer is stored in a filing apparatus. Japanese Patent Laid-Open No. H08-147446 (1996) discloses a technique which converts (renders) a document into PDL data via a printer driver, extracts character codes from a character object in the PDL data, and stores the character codes as character information along with the rendered image data.

On the other hand, there are some types of applications which do not output the character object as character codes. Specifically, there are application examples in which data drawn as characters by a user on the application is not converted into a character object when the data is converted into PDL data, and even when character codes can be extracted, the character codes become a character object difficult to use as a search index. In these cases, an effective search index cannot be provided to an image data only by extracting character codes from a character object in the PDL data.

Such cases will be illustrated below.

A character of a large sized font may be represented and treated as Path data which is a set of line segments on an application, driver, or PDL.

When a printer does not have a specified font of a character or a character is a decorated character with gradation and the like much applied, the character may be treated as an image data to be PDL data.

A character code may not identify a visual data by itself (visual data varies depending on a type of font).

When a character string of an original character is divided into single characters to be a drawing command, each character is obtained as a different character data from each other, so that a meaningful character data cannot be obtained.

Furthermore, a decorated character and a large sized character which easily cause problems like the above often have important meanings, so that losing character information of the character becomes a cause of preventing providing an effective metadata.

SUMMARY OF THE INVENTION

To solve the above problems, an image processing apparatus according to the present invention comprises a rendering component configured to obtain image data by rendering PDL data; an extracting component configured to extract a character object from the image data obtained by the rendering component; a character recognizing component configured to obtain character code information by performing character recognition processing on the character objeccharacterracted by the extracting component; and a meta data providing component configured to provide metadata including the character code information extracted by the character recognizing component to the image data.

In addition, wherein the rendering component stores the image data obtained by performing a normal rendering processing on the PDL data into a first rendering buffer, and stores image data obtained by converting and rendering a character object included in the PDL data into a second rendering buffer, the character recognizing component obtains character code information by performing character recognition processing on the image data stored in the second rendering buffer, and the metadata providing component provides metadata including the character code information extracted by the character recognizing component to the image data stored in the first rendering buffer.

According to the present invention, a more reliable character code string can be extracted than when extracting character codes from a character object in the PDL data, and a document in which more effective search index is provided to the image data can be stored. In addition, a document storing of PDL data is possible while maintaining uniformity with a document storing of a scanned image by a document format including a search index extracted from the scanned image.

Further features of the present invention will become apparent from the following description of exemplary embodiments (with reference to the attached drawings).

BRIEF DESCRIPTION OF THE DRAWINGS

FIG. 9 is an example of a format of a data vectorized in a vectorization processing unit 703;

FIG. 11 is an illustration showing an example of block information of each attribute and input file information when the object division is performed;

DESCRIPTION OF THE EMBODIMENTS

First Embodiment

A preferred embodiment of the image processing apparatus and system will be described below on the basis of the drawings.

[Image Processing System]

Figure 1:
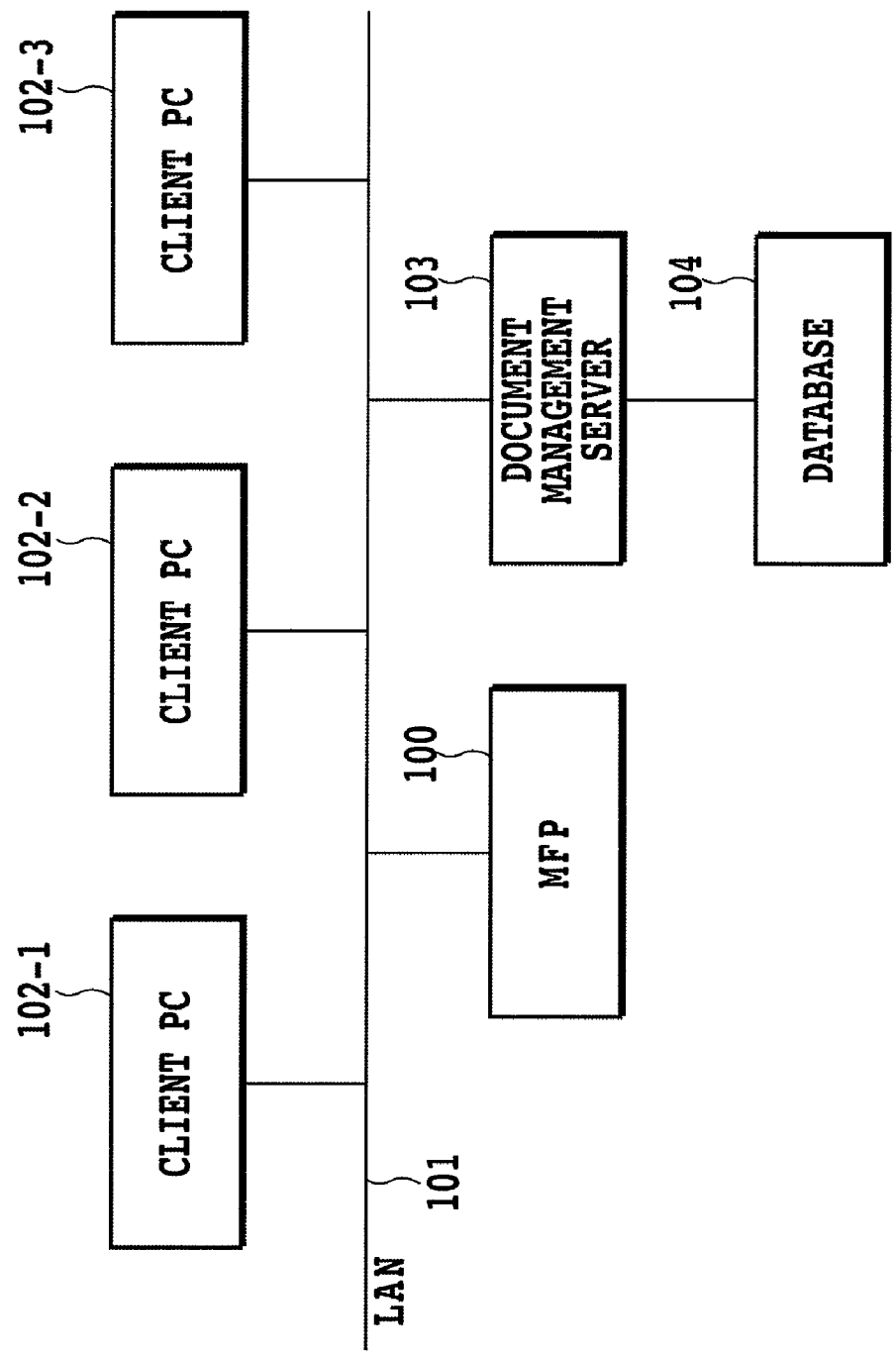
FIG. 1 is a block diagram illustrating a schematic configuration of an image processing system according to the present invention.

First, the image processing system of an embodiment of the present invention will be described by using FIG. 1. FIG. 1 is a block diagram illustrating a schematic configuration of the image processing system.

The image processing system of this embodiment has a configuration in which an MFP 100 and one or more client PCs 102-1 to 102-n (host computers) are connected on a LAN 101. In addition to the MFP 100 and the client PC 102, this system also includes a document management server 103 and a data base 104 connected to and used by this server.

In this embodiment, the MFP 100 scans a paper document to generate an image data of the document. In addition, the MFP 100 receives PDL data generated by the client PC 102, and interprets and renders the PDL data. In addition, the MFP 100 records the image data on a paper medium by an image recording apparatus (printer) 113, transmits the image data to a network, or stores and memorizes the image data into a storage unit 115 of a second storage apparatus included in the MFP 100 itself. An image data storing component may be the data base 104 on the network. In this case, the MFP 100 communicates with the document management server 103, and appropriately controls so that the image data is stored in the data base 109.

[MFP (Image Processing Apparatus)]

Next, a configuration of the MFP 100 of an embodiment of the present invention will be described by using FIG. 2.

Figure 2:
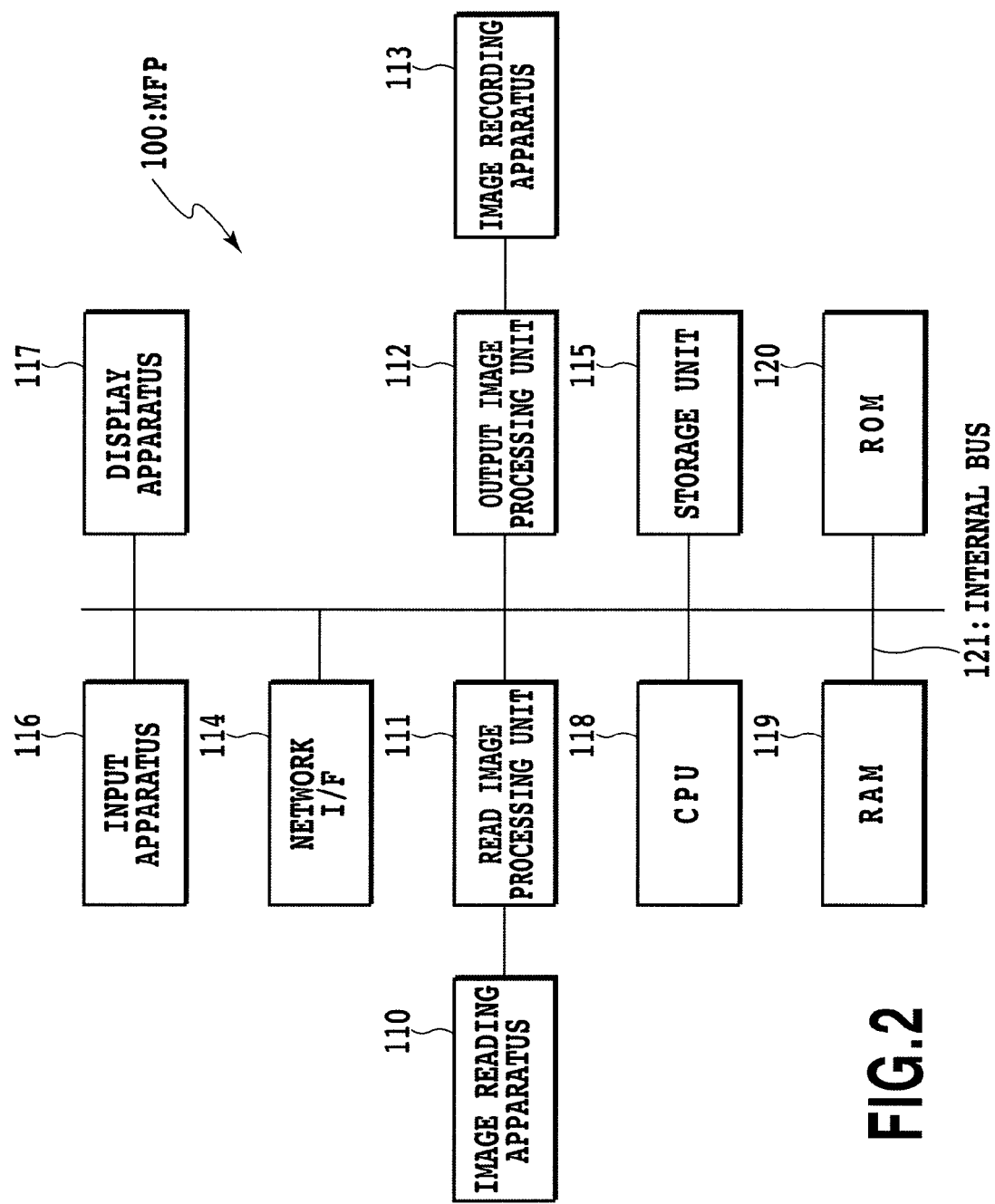
FIG. 2 is a block diagram illustrating an example configuration of an MFP of an embodiment according to the present invention.

FIG. 2 is a block diagram illustrating a configuration of the MFP 100.

The MFP 100 includes an image reading apparatus 110 having a not shown Auto Document Feeder (hereinafter, ADF). This image reading apparatus 110 illuminates an image on bundled documents or a sheet of document by a light source, and focuses a reflected image on a solid-state image-taking element via a lens. The solid-state image-taking element generates an image reading signal of a predetermined resolution (for example, 600 dpi) and a predetermined brightness level (for example, 8-bit gradation), and an image data of raster data is constituted by this image reading signal. The image data read by the image reading apparatus 110 is corrected to an image data easy to process in the MFP 100 by a read image processing unit 111. Specifically, the read image processing unit 111 performs a noise removing processing, a gamma correction processing, a color reproduction correction processing, a filter processing, and so on.

The MFP 100 has the storage unit 115 and the image recording apparatus 113. When performing a normal copy function, the MFP 100 further performs an image processing for the image recording apparatus on the image data processed by the read image processing unit 111 by using an output image processing unit 112, to convert the image data into a recording signal. When making multiple copies, the MFP 100 stores the recording signal for one page in the storage unit 115, and then outputs the recording signal for one page sequentially to form a recorded image on a recording paper.

The MFP 100 includes a network I/F 114 for connecting with the LAN 101, and has a function in which the image recording apparatus 113 records the PDL data outputted from the client PC 102 by using a printer driver. The PDL data outputted from the client PC 102 via the printer driver is stored in a part of the storage unit 115 from the LAN 101 via the network I/F 114. The stored PDL data is retrieved, and developed as a Bitmap data by a PDL processing and a rendering processing described later which are realized by a CPU 118 executing a program loaded into a RAM 119 from a ROM 120 or the storage unit 115. The image processing for the image recording apparatus is performed on the Bitmap data in the output image processing unit 112 to convert the Bitmap data into the recordable recording signal. The recording signal is outputted to the image recording apparatus 113 and recorded on the recording paper as a recorded image.

The storage unit 115 is, for example, a HDD and the like, and has a function which can store the scanned image data from the image reading apparatus 110 and the image data rendered from the PDL data outputted from the client PC 102 via the printer driver (hereinafter this function is called a BOX function).

The MFP 100 includes an input apparatus 116 and a display apparatus 117 as interfaces for operating the MFP 100. On the display apparatus 117, information illustrating a status of the MFP 100 and the image data stored by the BOX function are displayed. The display apparatus 117 includes a touch panel. When a user touches a button displayed on the display apparatus 117, an input can be performed by the user operation. As an apparatus for accepting another user input, the input apparatus 116 includes keys for inputting numerals.

The above configuration elements of the MFP 100 are controlled by the program on the RAM 119 which is operated by the CPU 118 via an internal bus 121.

[Operation of Each Function of the MFP]

Figure 3:
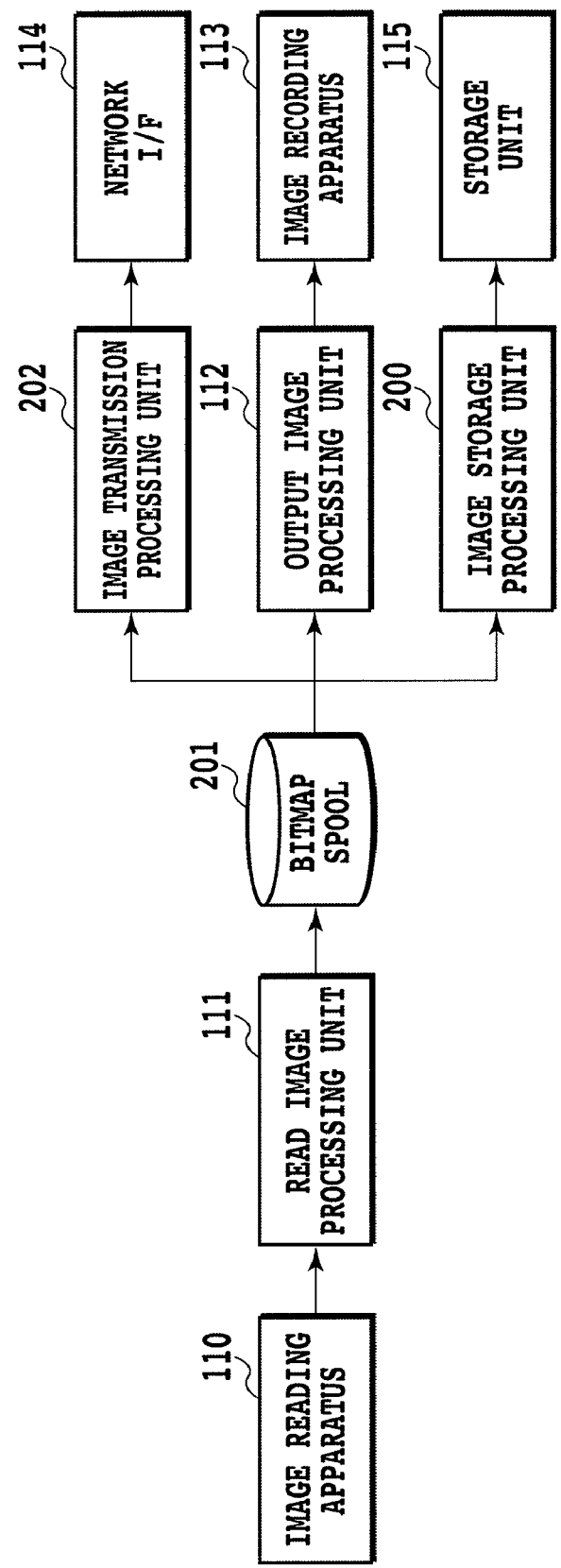
FIG. 3 is an illustration showing a process flow of each processing block realizing a copy function, a scan transmission function, a BOX function of the MFP when reading an image.
Figure 4:
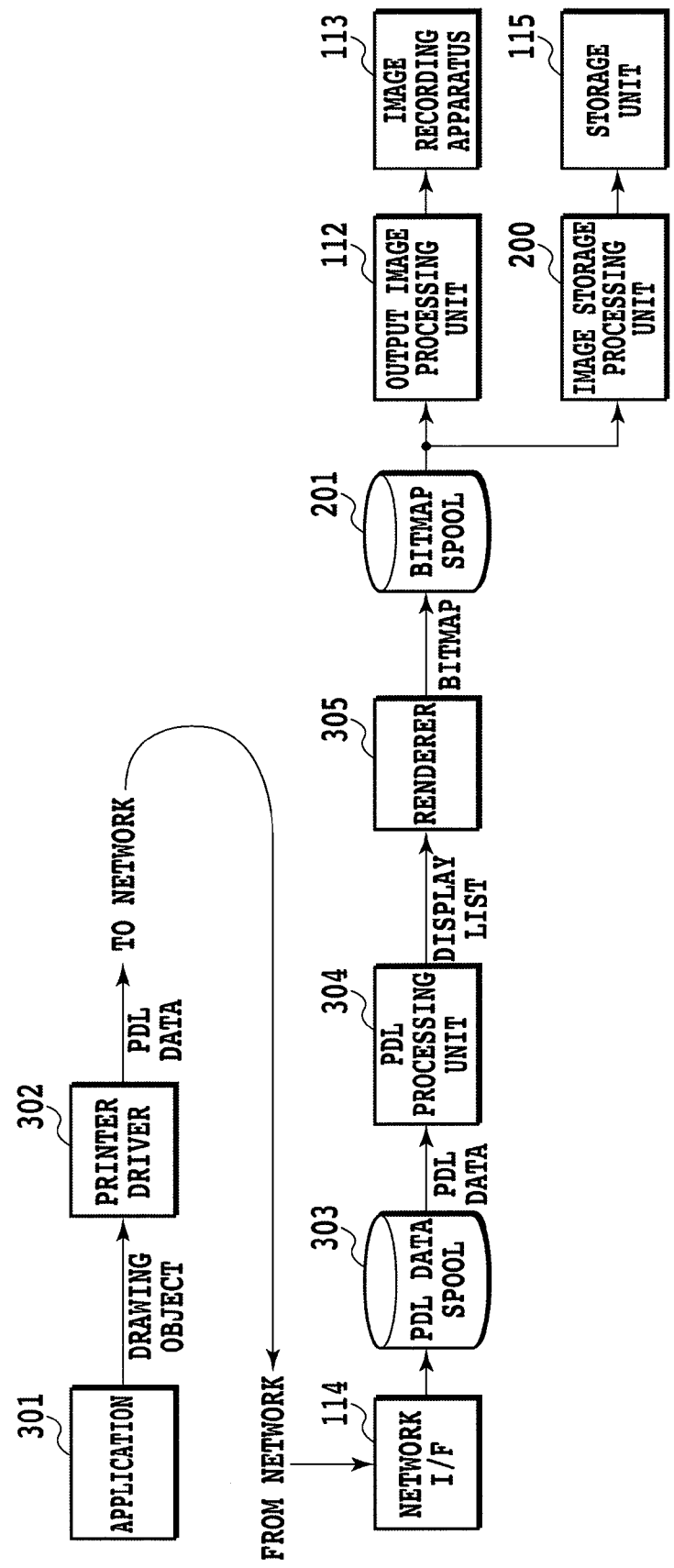
FIG. 4 is an illustration showing a process flow of each processing block realizing a PDL processing function and a BOX function for PDL data of the MFP.

Next, the functions of the MFP in this embodiment will be described by using FIGS. 3 to 6. FIG. 3 is an illustration showing a process flow of each processing block realizing a copy function, a scan transmission function, a BOX function of the MFP 100. FIG. 4 shows a process flow by each processing block for the PDL processing function and the BOX function for the PDL data. For an example, processing of these functions is started by a user's instruction from a UI screen 500 in FIG. 5.

Figure 5:
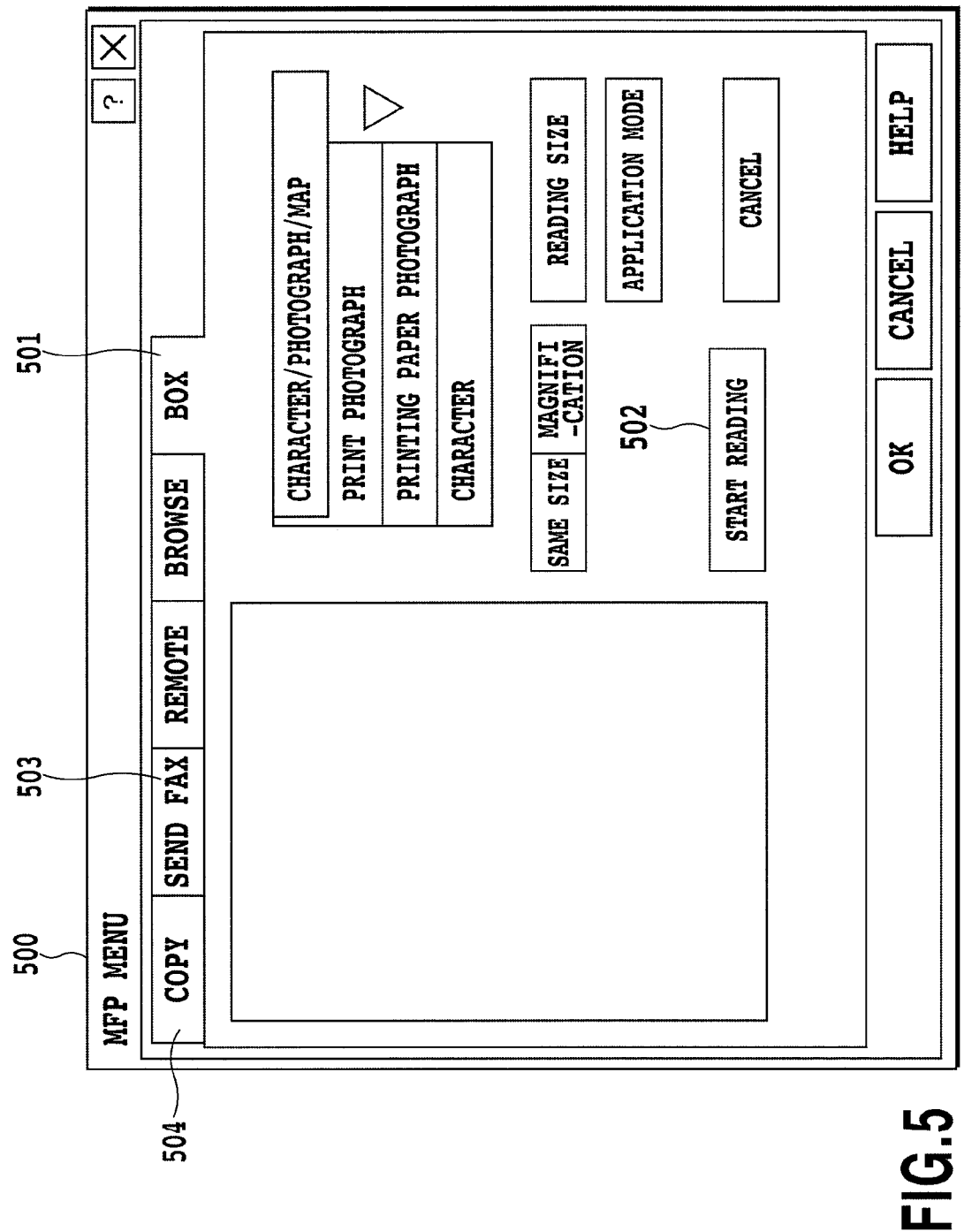
FIG. 5 is an illustration showing an example UI when using functions such as the copy, the scan transmission, a BOX storage, and the like in the embodiment.

The user is let to select what function the MFP 100 will operate by each function tab such as a copy tab 504, a send FAX tab 503, and a BOX tab 501 which are located in upper part of FIG. 5. In the figure, since the BOX tab 501 is selected, if the reading start button 502 is pressed at this time, the MFP 100 controls so that the BOX storage is performed. Like the tab 502, the other tabs have a start button for starting a corresponding function. When the start button is pressed, a processing of the corresponding function is started in the same way as the BOX function is started.

The MFP 100 controls so that the image reading apparatus 110 reads a paper document to obtain an image data in every case of the copy function, the scan transmission function, and the BOX function. Next, the MFP 100 performs an image processing for the scanned image using the read image processing unit 111, and stores a Bitmap data in a Bitmap spool (rendering buffer) 201 which is a temporary image data storage area realized by using a part of the storage unit 115.

When using the copy function, after performing an image processing on the Bitmap data retrieved from the Bitmap spool 201 in the output image processing unit 112 to convert the Bitmap data into an image recording signal, the MFP 100 controls to transmit the image recording signal to the image recording apparatus 113.

In the scan transmission function, the MFP controls so that an image transmission processing unit 202 realized by the program operating on the CPU 118 transmits the image data to a device such as a PC having an IP address specified on the UI, via the network I/F 114.

Lastly, in the BOX function, after processing the Bitmap data retrieved from the Bitmap spool 201 in an image storage processing unit 200 realized by the program operating on the CPU, the MFP 100 stores the processed Bitmap data into the storage unit 115. The image storage processing mentioned here will be described in detail later.

A processing of the PDL processing function of the MFP 100 is started when a user issues a print instruction by an application 301 on the client PC. As shown in FIG. 4, an application data is transferred as drawing information from the application 301 operating on the client PC 102 to the printer driver 302. This data is converted into a data (PDL data) compatible with a PDL language such as PostScript and LIPS by the printer driver 302, and transmitted to the network via a network I/F (not shown in the figure) of the client PC 102.

The MFP 100 stores the PDL data received by the network I/F 114 into a PDL data spool 303 which is a temporary storage area of the PDL data. The PDL data having been once spooled is retrieved, thereafter a language of the PDL data is interpreted by the PDL processing unit 309, and a Display List which is an intermediate data structure which can be processed by a renderer 305 is generated. The renderer 305 develops the generated Display List to a Bitmap data, and temporarily stores the Bitmap data into the Bitmap spool 201.

When an instruction of the printer driver 302 is a print, the MFP 100 retrieves the image data from the Bitmap spool 201, thereafter performs an image processing by the output image processing unit 112, and sends the recording signal to the image recording apparatus 113 to end the process. When the instruction of the printer driver is to store the image data, the MFP 100 performs the image storage processing 200 described later, and thereafter stores the image data into the storage unit 115.

Figure 6:
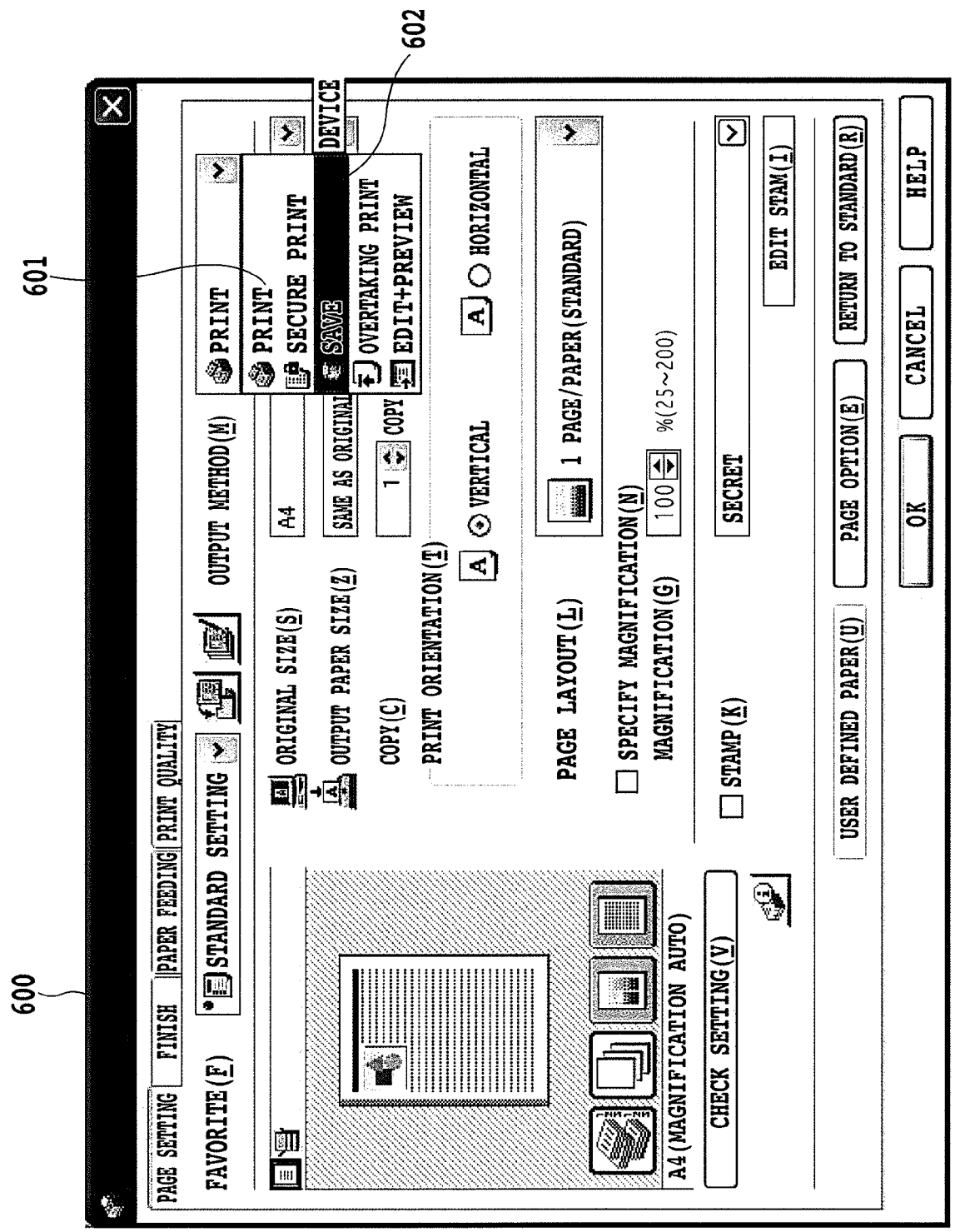
FIG. 6 is an illustration showing an example of a driver UI of the embodiment.

Regarding the instruction of the printer driver, as shown in FIG. 6, the user is let to select whether it is a storage instruction or a print instruction by a UI item 602 for specifying storage and a UI item 601 for specifying a print.

[Image Storage Processing]

Next, the image storage processing will be described by using FIG. 7.

Figure 7:
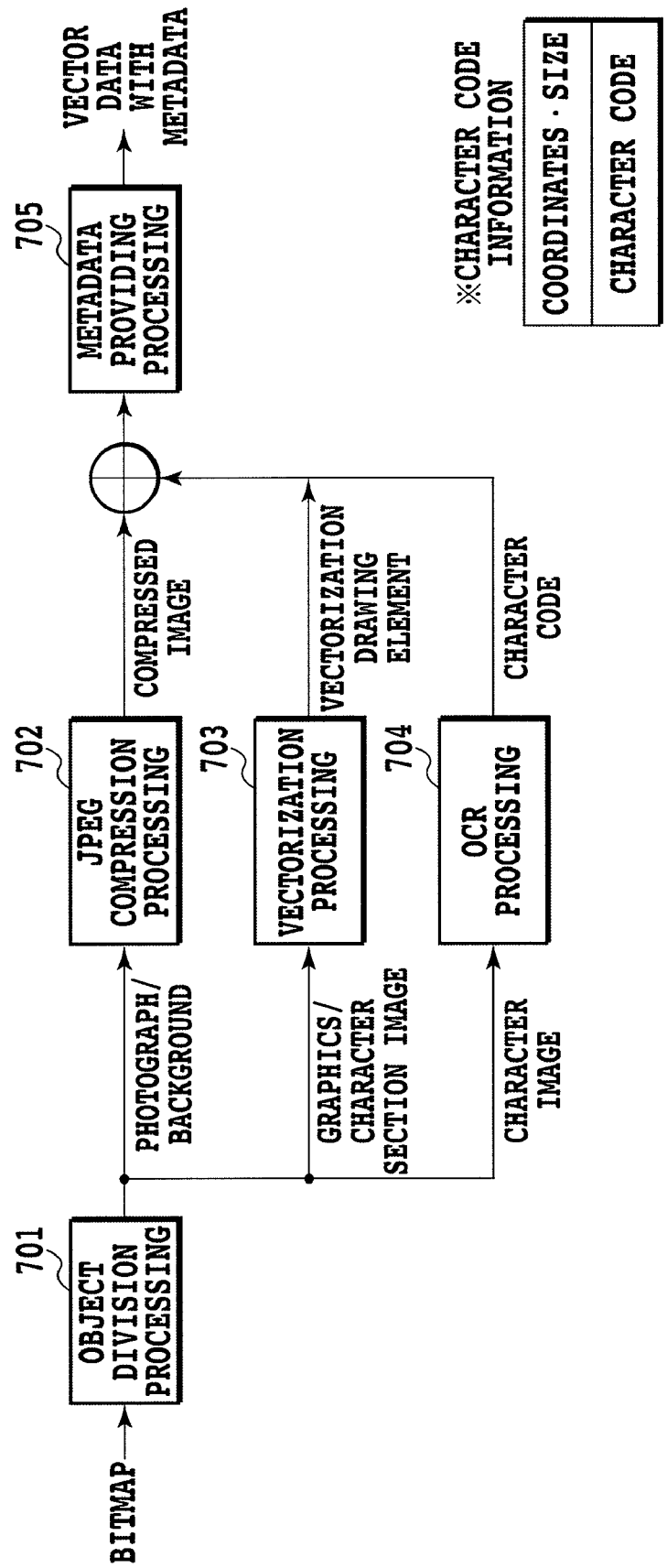
FIG. 7 is a block diagram illustrating a configuration of an image storage processing unit 200.

FIG. 7 is a block diagram illustrating a configuration of the image storage processing unit 200.

FIG. 7 shows an example of a process flow in the image storage processing unit, the process being performed to store the image data retrieved from the Bitmap spool 201 into the HDD which is used as the BOX, when a storage of a document is instructed by the UI 500 of the MFP 100 or the driver UI 600.

MFP 100 divides the image data retrieved from the Bitmap spool 201 into object divisions, each of which is an area including an object, by an object division processing unit 701.

Types of the objects after the object division processing are character, photograph, graphic (drawing, line drawing, table), and background etc. In the object division processing, the image data which is bitmap data is divided into image areas each of which corresponds to an object, and the type of the object (character, photograph, graphic, background) is determined by a known method.

When the object is determined to be a photograph object, this area is JPEG-compressed by a JPEG compression processing unit 702. When the object is a background object, the corresponding area is also JPEG-compressed. On the other hand, when the object is determined to be a graphic, the object is vectorized by a vectorization processing unit 703, and converted into path data. When the object is determined to be a character object, the object is vectorized in the same way as the graphic object in the vectorization processing unit 703, and converted into path data. At the same time, when the object is the character object, the Bitmap data of the corresponding area is also sent to an OCR processing unit 704, an OCR processing is performed on the data, and data encoded into character codes is extracted. All the object data and the data encoded into character codes are integrated into one file.

Finally, in a metadata providing processing unit 705, generated metadata is provided to each object. Each of the object data provided with the metadata is stored in a BOX 115 installed in the MFP 100. The stored data may be displayed on the UI screen.

The metadata providing processing, the object division processing, and the vectorization processing will be described in detail below.

[Metadata Providing Processing]

First, the metadata providing processing will be described by using FIG. 8.

Figure 8:
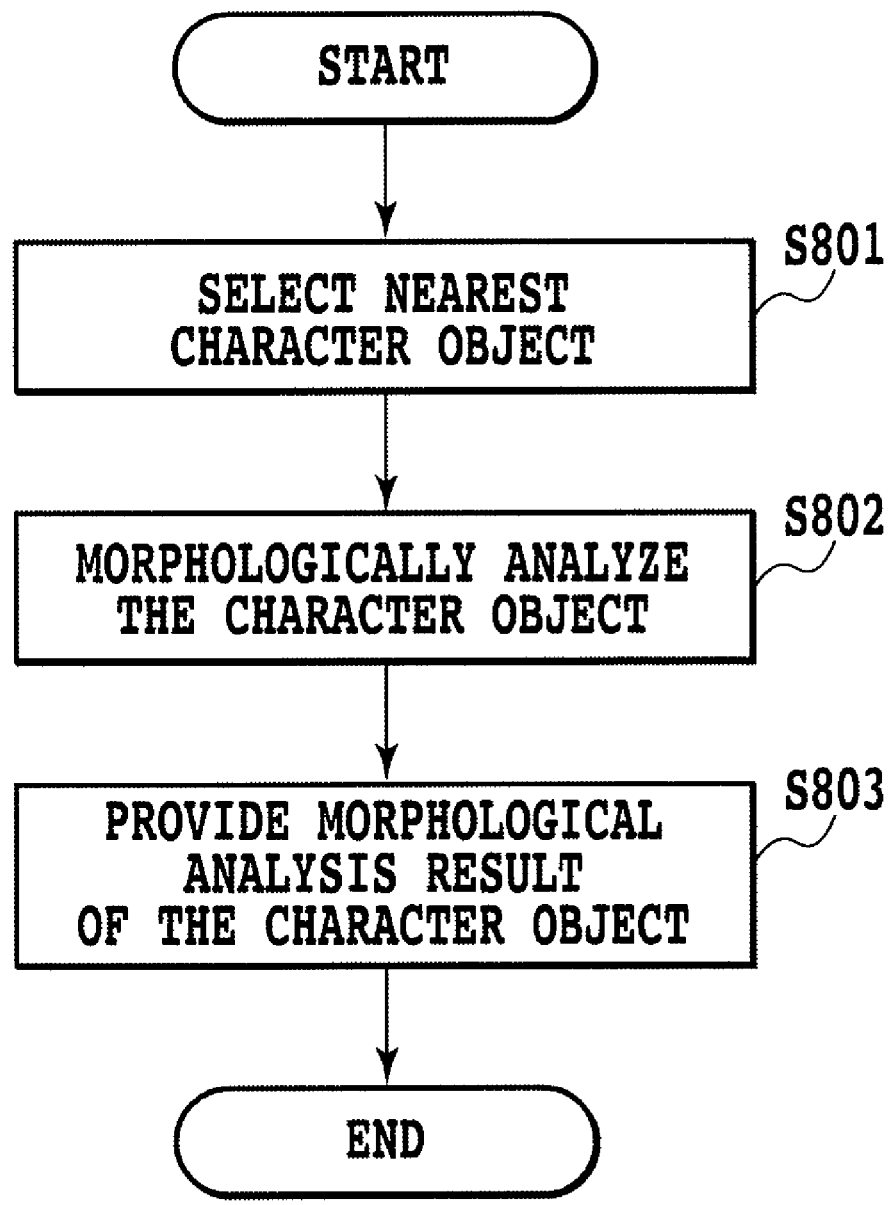
FIG. 8 is a flowchart of a metadata providing processing.

FIG. 8 is a flowchart of the metadata providing processing performed in the metadata providing processing unit 705.

First, in step S801, a character object nearest to the object which will be provided with the metadata is selected.

Next, in step S802, a morphological analysis is performed on the character object selected in step S801.

Next, in step S803, a word extracted by the morphological analysis in step S802 is provided to the target object as the metadata. The target object of the metadata providing processing may be a character object. In this case the object nearest to the target object includes the character object itself. Specifically, in this case, the word extracted from the character object is provided as the metadata of the character object.

When generating the metadata, not only the word extracted by the morphological analysis, but also an image characteristic amount such as a color histogram extracted from the object, sentence summary information obtained by a syntactic analysis and the like which are more sophisticated than the morphological analysis, and so on can be included.

The metadata obtained in this way is written for each of the objects, and stored in the HDD used as the BOX along with the image data (vectorized data or JPEG-compressed data) of the object.

[Data Format of the Vectorization Result]

Next, a format of data vectorized in the vectorization processing unit 703 will be described by using FIG. 9.

FIG. 9 is an illustration showing an example format of the data vectorized in the vectorization processing unit 703. In this embodiment, although the data vectorized in the vectorization processing unit 703 is represented by a SVG format, the format is not limited to this.

In FIG. 9, descriptions of the objects are surrounded by a frame for illustrative purposes. A frame 901 shows an bitmap image attribute, in which area information indicated by the bitmap image object area and bitmap information are shown. A frame 902 shows information of the character object, and a frame 903 represents the information of the character object, which is shown in the frame 902, as the vector object. A frame 904 shows a line art such as the table object.

When the metadata provided in the metadata providing processing unit 705 is, for example, "Taro Yamada", the following data may be added to an end of each block.

```
<metadata>
    <text_index>Taro Yamada</text_index>
</metadata>
```

[Object Division Processing]

Next, the object division processing will be described by using FIGS. 10, 11.

Figure 10:
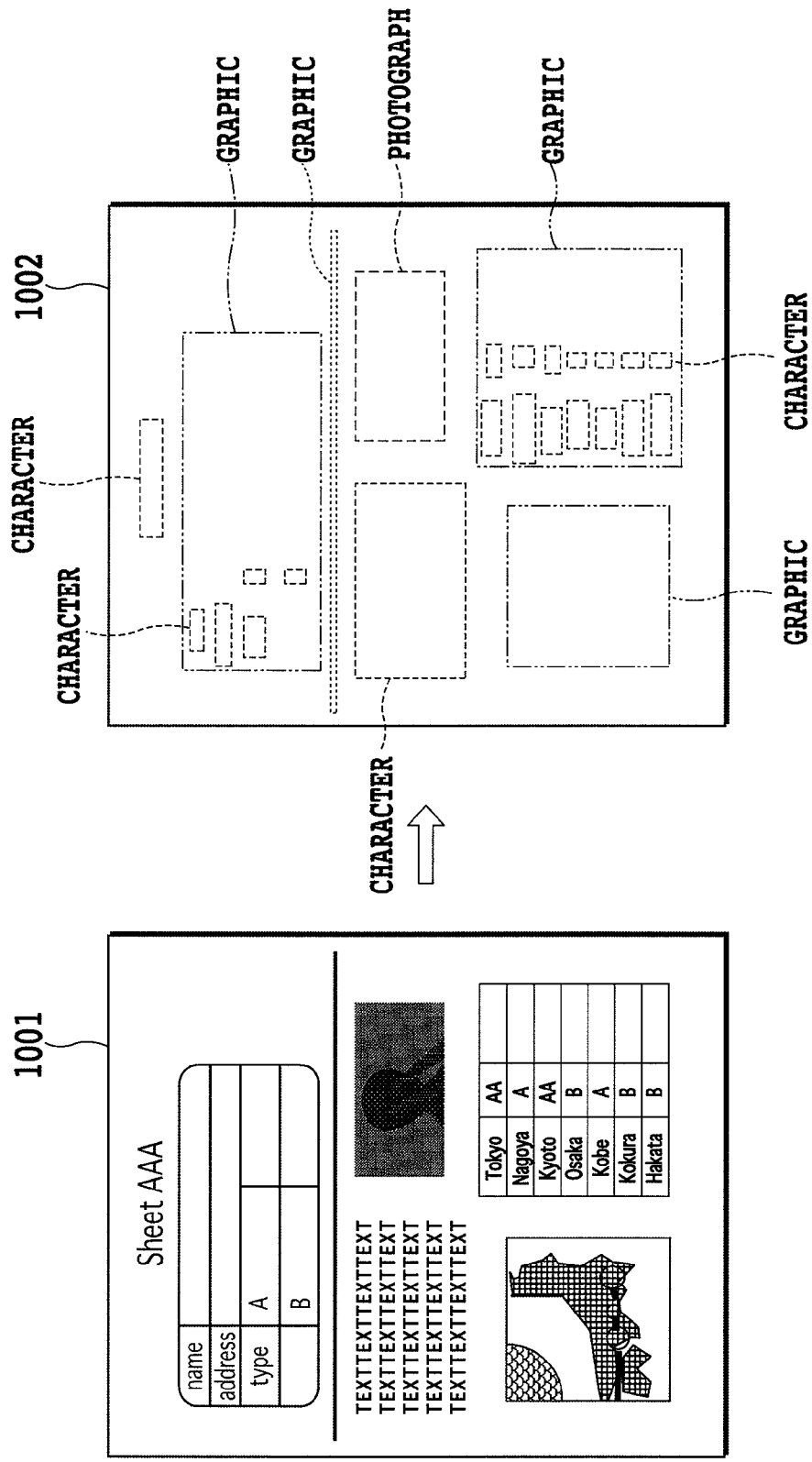
FIG. 10 is an illustration showing an example of an image data object division result by an object division processing.

FIG. 10 is an illustration showing an example of an image data object division result by the object division processing. FIG. 11 is an illustration showing an example of block information of each attribute and input information when the object division is performed.

As shown in right image 1002 in FIG. 10, the object division processing unit 701 divides an input image 1001 (FIG. 10, left side) into rectangular blocks for each attribute. As described above, in this embodiment, although the attributes of the rectangular blocks are character, photograph, graphic (drawing, line drawing, table, etc.), of course, the attributes are not limited to these, and it is also possible that the attributes are further segmentalized into color character and black character, or natural image and CG image.

In the object division processing, first, the image data which is retrieved from the Bitmap spool 201 and stored in a RAM is binarized into black and white, and pixel blocks surrounded by a contour of black pixels are extracted.

Furthermore, sizes of black pixel blocks of the extracted pixel blocks are evaluated, and contours of white pixel blocks in a black pixel block having a size larger than or equal to a predetermined size are traced. Furthermore, sizes of white pixel blocks are evaluated, and contours of black pixel blocks in a white pixel block are traced. In this way, recursively, the pixel blocks are extracted and the contours are traced as long as internal pixel blocks have a size larger than or equal to a predetermined size. The size of a pixel block is evaluated by, for example, the dimensions of the pixel block.

A rectangular block circumscribing the pixel block obtained in this way is generated, and an attribute is determined on the basis of the size and shape of the rectangular block.

For example, a rectangular block having an aspect ratio of near 1 and a size of a certain range is determined to be a character like block which may be a character area rectangular block. When neighboring character like blocks are regularly aligned, a new rectangular block constituted by integrating these character like blocks is generated, and this new rectangular block is determined to be a character area rectangular block.

A flat pixel block, and a black pixel block including white pixel blocks which are larger than a certain size and have a rectangular shape in an aligned condition are determined to be a graphic area rectangular block, and other pixel blocks having an indeterminate shape are determined to be a photograph area rectangular block.

In the object division processing, block information such as an attribute and input file information shown in FIG. 11 are generated for each of the rectangular blocks generated in this way.

In FIG. 11, the block information shown in this figure includes an attribute of each block, coordinates X and Y of the block position, width W, height H, and OCR information. The attribute is represented by numerals 1 to 3. Here, the attribute 1 shows the character area rectangular block, the attribute 2 shows the photograph area rectangular block, and the attribute 3 shows the graphic area rectangular block. The coordinates X and Y are X and Y coordinates of a starting point (coordinates of upper left corner) of each rectangular block in the input image. The width W and the height H are respectively a width in the X coordinate direction and a height in the Y coordinate direction of a rectangular block. The OCR information shows whether there is an OCR result which can be used as metadata of each block or not. In addition, as the input file information, the total number of blocks N which shows the number of the rectangular blocks is included.

The block information for each rectangular block is used for vectorization in a specified area. By using the block information, a relative positional relationship between the specified area and another area when they are combined can be identified, so that it is possible to combine a vectorized area and a raster data area without damaging the layout of the input image.

[Vectorization Processing]

Next, the processing in the vectorization processing unit 703 will be described by using FIG. 12.

Figure 12:
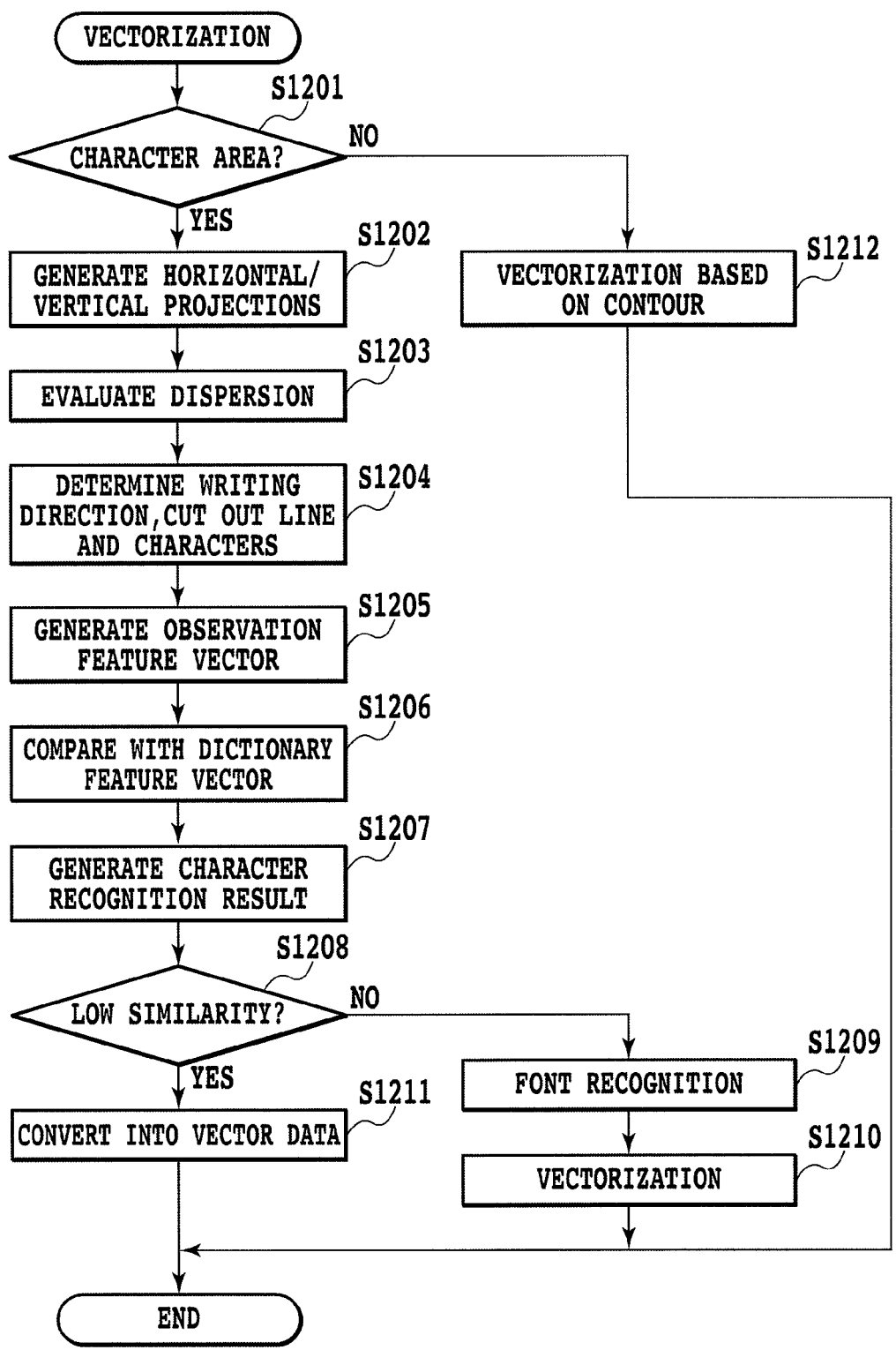
FIG. 12 is a flowchart illustrating a process flow in the vectorization processing unit 703.

FIG. 12 is a flowchart illustrating a process flow in the vectorization processing unit 703.

First, in step S1201, it is determined whether the specified area which is a target of the processing is the character area rectangular block or not. At this time, when the specified area is the character area rectangular block, the process proceeds to step S1202 and subsequent steps, and the character recognition is performed by using one of pattern matching methods as described later to obtain corresponding character codes. On the other hand, when the specified area is not the character area rectangular block, the process moves to step S1212.

In step S1202, in order to determine whether the specified area is a horizontal writing or a vertical writing (in order to determine the writing direction), projections of pixel values in the horizontal direction and the vertical direction within the specified area are taken.

Next, in step S1203, dispersion of the projections in step S1202 are evaluated. It is determined to be the horizontal writing when the dispersion of the horizontal projection is large, and it is determined to be the vertical writing when the dispersion of the vertical projection is large.

Next, in step S1204, the writing direction is determined on the basis of the evaluation result in step S1203, and a line cut-out is performed in accordance with the writing direction. Further, characters are cut out from the cut-out line to obtain character images. When breaking down to a character string or characters, a line is cut out by using the projection in the horizontal direction if the writing direction is horizontal, and characters are cut out on the basis of the cut-out line's projection in the vertical direction. For the character area of the vertical writing, the processing opposite to the above processing regarding the horizontal direction and the vertical direction is performed. When cutting out a line and characters, the size of the characters can be detected.

Next, in step S1205, for each character cut out in step S1204, a feature vector (here called an observation feature vector) which is a tens-dimensional numeral string converted from an amount of characteristic obtained from the character image is generated. There are various publicly known methods for extracting the observation feature vector. For example, there is a method which divides a character into a mesh pattern, counts character lines in each direction within each mesh as linear elements, and generates a vector the number of dimensions of which is the number of the meshes, as the feature vector. The above observation feature vector can be generated by using such a known method.

Next, in step S1206, the observation feature vector obtained in step S1205 is compared with a dictionary feature vector obtained for each font type in advance, and a distance between the observation feature vector and the dictionary feature vector is calculated.

Next, in step S1207, the distance calculated in step S1206 is evaluated, and a font type which has the smallest distance is determined to be the recognition result of the character.

Next, in step S1208, from the distance evaluation in step S1207, a degree of similarity is determined depending on whether the smallest distance is greater than a predetermined value or not. When the smallest distance is greater than the predetermined value, there is a high possibility that the character is erroneously recognized as another character having a similar shape. Therefore, when the smallest distance is greater than the predetermined value, the recognition result in step S1207 is not employed, and the process proceeds to a processing of step S1211. On the other hand, when the smallest distance is lower (smaller) than the predetermined value, the recognition result in step S1207 is employed, and the process proceeds to step S1209.

In step S1209 (font recognition step), the recognition processing of the character font is performed. In this embodiment, multiple types of dictionary feature vectors for each font type which are used for character recognition are prepared for a type of character shape, namely a font type. When performing pattern matching, a matching font type is outputted as font information along with a character code, so that the character font can be recognized.

Next, in step S1210, each character is converted into vector data by using the character code and the font information which are obtained by the character recognition and the font recognition, and corresponding outline data prepared in advance. When the input image is a color image, a color of each character is extracted from the color image, and the obtained color information is recorded along with the vector data.

In step S1211, a character is treated in the same way as general graphic, and the character is converted into an outline font character. In other words, for a character having a high possibility to be erroneously recognized, an outline vector data having visual high-fidelity to the image data is generated.

In step S1212, when the specified area is not a character area rectangular block, the vectorization processing is performed based on the contour of the image.

By doing the above processings, the image information belonging to the character area rectangular block can be converted into vector data having about the same shape, size, and color as the image information.

[Vectorization of Graphic Area]

Next, the vectorization of the graphic area will be described by using FIGS. 13 and 14.

Figure 13:
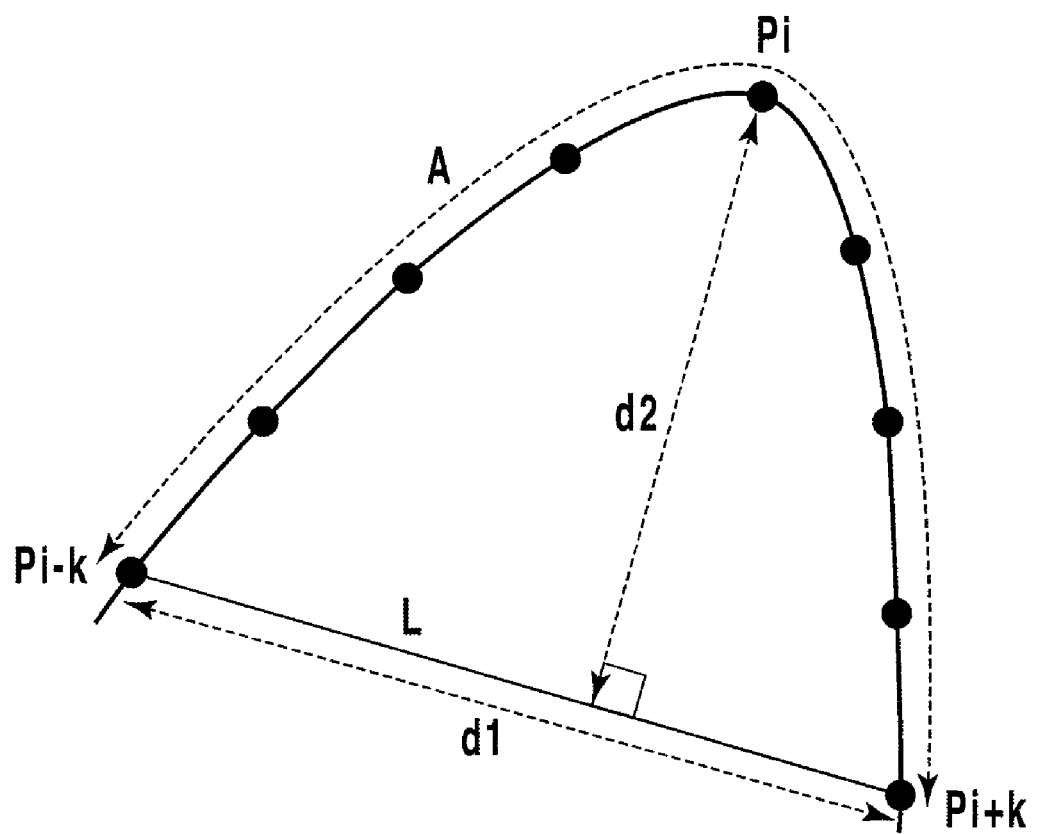
FIG. 13 is an illustration for explaining a corner extraction processing in the vectorization processing.

FIG. 13 is an illustration for explaining "corner" extraction processing in the vectorization processing. FIG. 14 is an illustration for explaining a contour organizing processing in the vectorization processing.

In the object division processing, when the specified area is determined to be an area other than the character area rectangular block, in other words, determined to be the graphic area rectangular block, a contour of a black pixel block extracted from the specified area is converted into vector data.

In the vectorization of an area other than the character area, first, in order to represent a line drawing and the like as a combination of straight lines and/or curved lines, "corners"

which divide a curved line into multiple segments (pixel strings) are detected. The "corner" is a point where the curvature is the maximum. For example, the determination whether the pixel Pi on the curved line in FIG. 13 is the "corner" or not is performed as below.

The pixels Pi−k and Pi+k which are a predetermined number of pixels (k pixels) apart from the starting pixel Pi along the curved line in both directions are connected by a line segment L. The distance between the pixels Pi−k and Pi+k is assumed to be d1, the distance between the line segment L and the pixel Pi is assumed to be d2, and the length of the arc between the pixels Pi−k and Pi+k along the curved line is assumed to be A. When the d2 is the maximum or a ratio (d1/A) is smaller than or equal to a threshold level, the pixel Pi is determined to be the "corner".

A pixel string divided by the "corner" is approximated by a straight line or a curved line. An approximation to a straight line is performed by least square method and the like, and an approximation to a curved line is performed by using three-dimensional spline function and the like. The pixel of "corner" which divides a pixel string is a start point or an end point of an approximate straight line or an approximate curved line.

Furthermore, it is determined whether there is an inner contour of a white pixel block in the vectorized contour or not. When there is an inner contour, the inner contour is vectorized, and when there is a further inner contour, the further inner contour is also vectorized. In this way, recursively, inner contours of inverted pixels are vectorized.

As described above, when using a segment line approximation of a contour, an outline of a figure having any shape can be vectorized. When the original document is in color, a color of a figure is extracted from the color image, and the obtained color information is recorded along with the vector data.

Figure 14:
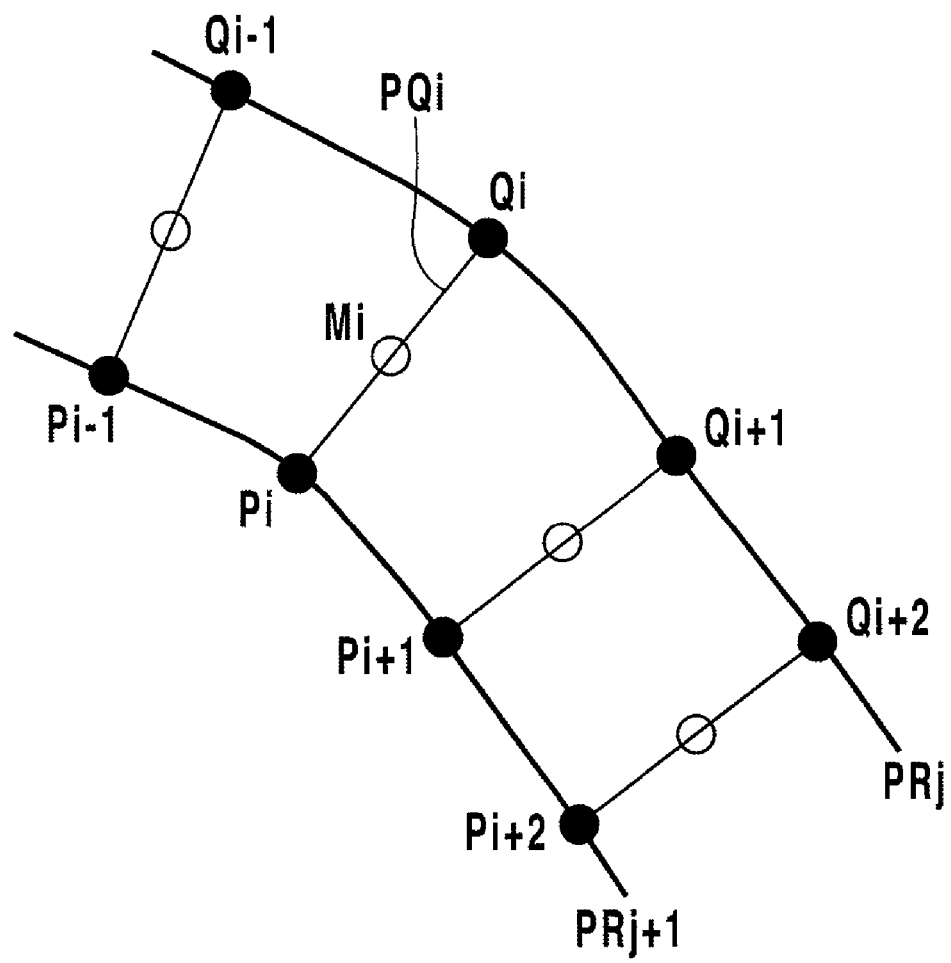
FIG. 14 is an illustration for explaining a contour organizing processing in the vectorization processing.

As shown in FIG. 14, when an outer contour PRj and an inner contour PRj+1 or another outer contour are neighboring each other in a certain observation section, two or more contours can be integrated into one contour, which is represented as a line having a thickness. For example, a distance PQi from each pixel Pi on a contour PRj+1 to the nearest pixel Qi on a contour PRj is calculated, and when a deviation of PQi is small, the observation section can be approximated by a straight line or a curved line along a point string of midpoints Mi between pixels Pi and Qi. The thickness of the approximate straight line or the approximate curved line is, for example, an average value of the distances PQi. A table which is an aggregate of lines can be effectively vectorized by converting the table into an aggregate of lines having a thickness.

After the contour organizing processing, the entire processing of vectorization is completed. The photograph area rectangular block is not vectorized and is left as image data.

[Grouping of Vector Data]

Next, grouping of vector data will be described by using FIG. 15.

Figure 15:
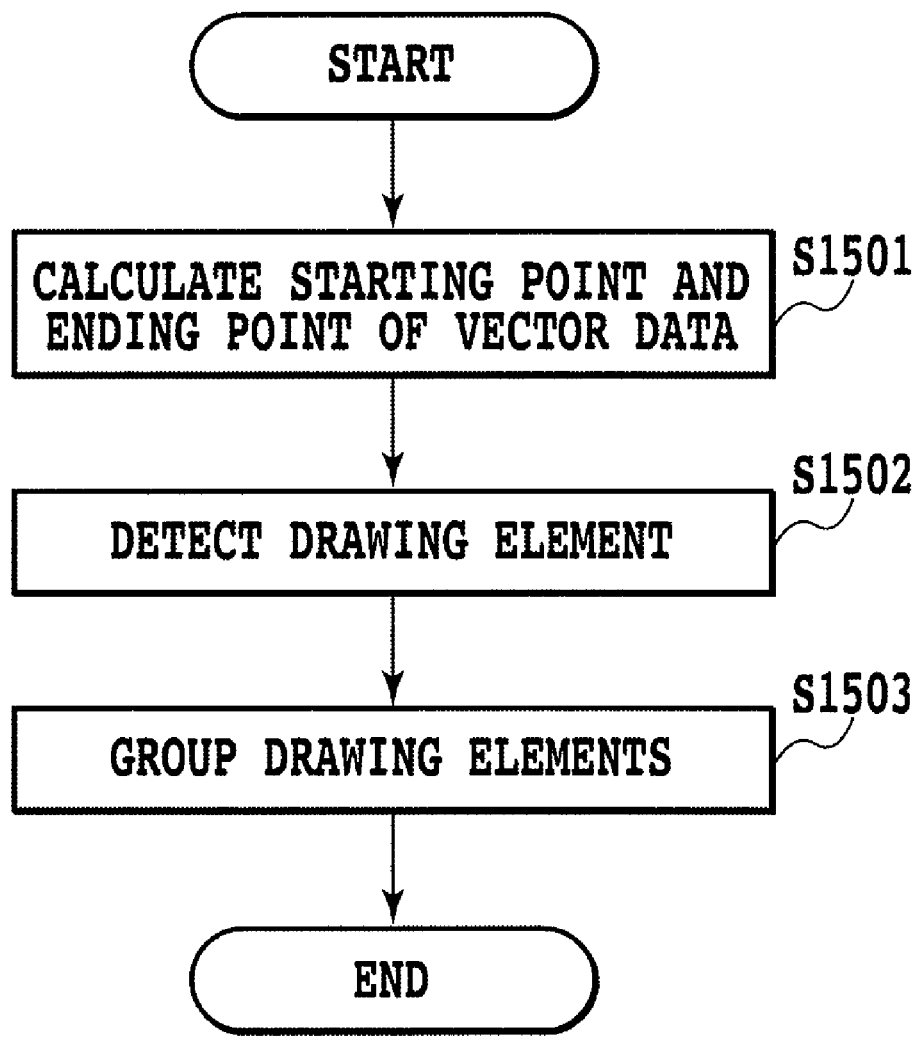
FIG. 15 is a flowchart illustrating a grouping processing of vector data generated in FIG. 12.

FIG. 15 is a flowchart illustrating the grouping processing of vector data generated by the vectorization processing described using FIG. 12.

After vectorizing an outline of a line drawing and the like by the vectorization processing, vectorized segment lines are grouped for each drawing object.

First, in step S1501, a starting point and an ending point of each vector data are calculated.

Next, in step S1502 (drawing element detection), a drawing element is detected by using the starting point and ending point information obtained in step S1201. Here, the drawing element is a closed figure constituted by the segment lines. When detecting the drawing element, vectors are connected at the shared "corner" pixel which is a starting point and an ending point. In other words, a principle that each vector constituting a closed figure has vectors respectively connected to each of both ends thereof is applied.

Next, in step S1503, the other drawing elements or segment lines in the drawing elements are grouped to form one drawing object. If there is no other drawing element or segment line in the drawing elements, the drawing element itself is formed to the drawing object.

[Detection of Drawing Element]

Next, a detection processing of the drawing element will be described by using FIG. 16.

Figure 16:
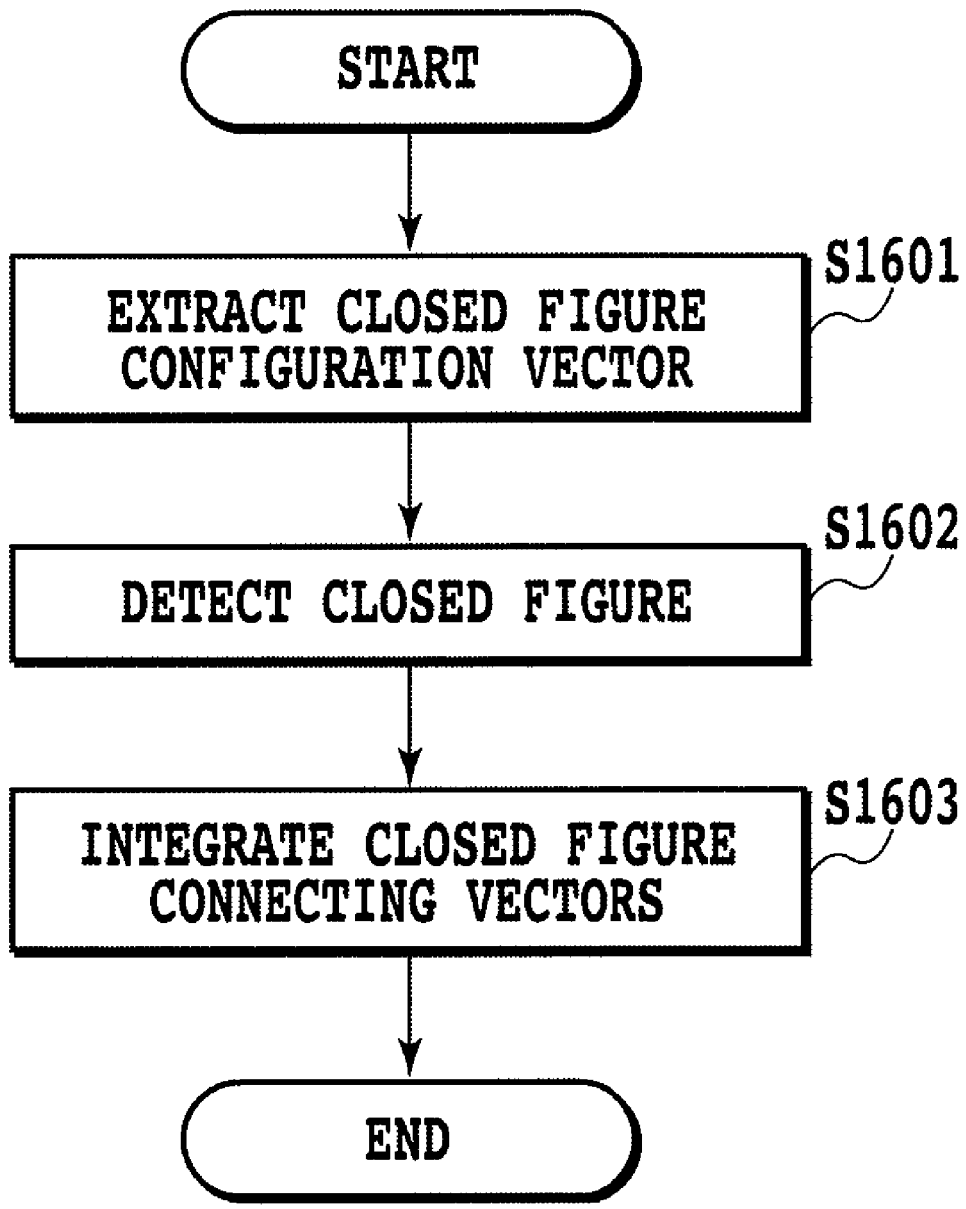
FIG. 16 is a flowchart illustrating a drawing element detection processing for the vector data grouped in the processing of FIG. 15.

FIG. 16 is a flowchart illustrating a drawing element detection processing for the grouped vector data.

The processing of the aforementioned step S1502 (drawing element detection) is executed by each step in FIG. 16.

First, in step S1601, unnecessary vectors which do not have vectors connected to both ends thereof are removed from the vector data, and vectors which constitute a closed figure are extracted.

Next, in step S1602, regarding vectors constituting the closed figure, by using an end point (starting point or ending point) as a search starting point, vectors are searched in a certain direction (for example, clockwise direction) sequentially. Specifically, at the other end point, an end point of another vector is searched, and a nearest end point within a predetermined distance is determined to be an endpoint of a connection vector. When the search goes around the vectors constituting the closed figure and returns to the starting point, all the vectors which have been passed through are grouped as a closed figure constituting one drawing element. All vectors constituting a closed figure within the closed figure are also grouped. Furthermore, by using a starting point of a vector which has not yet been vectorized, the same processing is repeated.

Finally, in step S1603, a vector whose end point is near to the vector grouped in step S1602 as a closed figure is detected from the unnecessary vectors removed in step S1601, and grouped as one drawing element.

By the above processing, a drawing element can be used as a reusable individual drawing object.

[Display Method]

The MFP 100 can display the document stored in the HDD used as the BOX by the display apparatus 117, and can be operated by using the input apparatus 116 and the like, for checking the document, or for an operation such as a search. Hereinafter, UI displays for these operations will be described in detail by using FIGS. 17 to 21.

FIGS. 17 to 21 are an illustration showing an example of a UI display in this embodiment.

Figure 17:
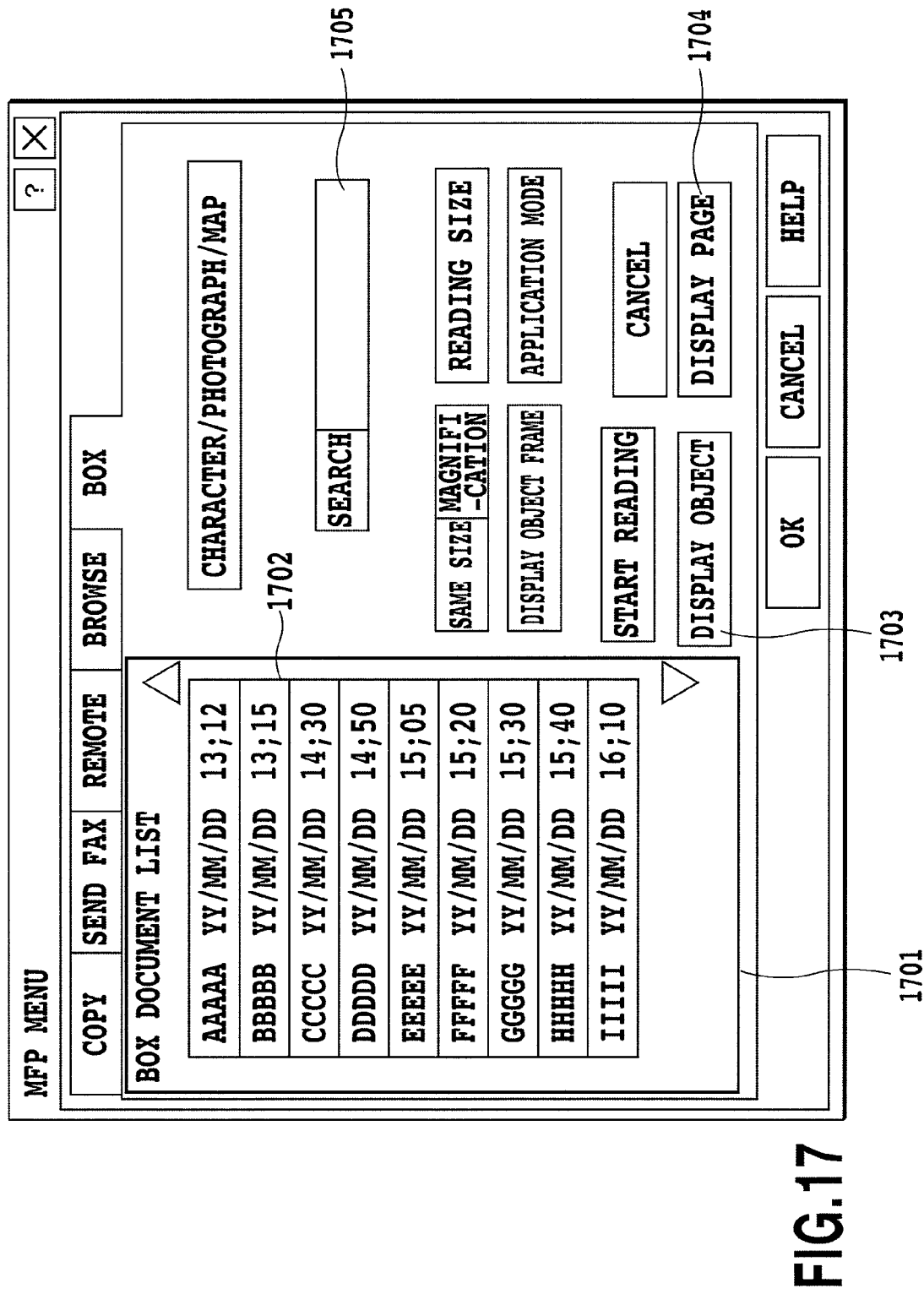
FIG. 17 is an illustration showing an example of a UI display when performing the BOX storage in the embodiment.

FIG. 17 shows a UI on which a data list (BOX document list 1701) stored in the BOX is displayed. As shown by the reference numeral 1702 in FIG. 17, each document has a name, and information such as inputted time is also displayed. When performing an object division display, by selecting a desired document in the BOX document list 1701 and pressing the display button 1703, the display changes, so that the object division display can be performed. This will be described later. In addition, by selecting a document in the BOX document list 1701 and pressing the page display button 1704, the display can be changed. This will also be described later.

Figure 18:
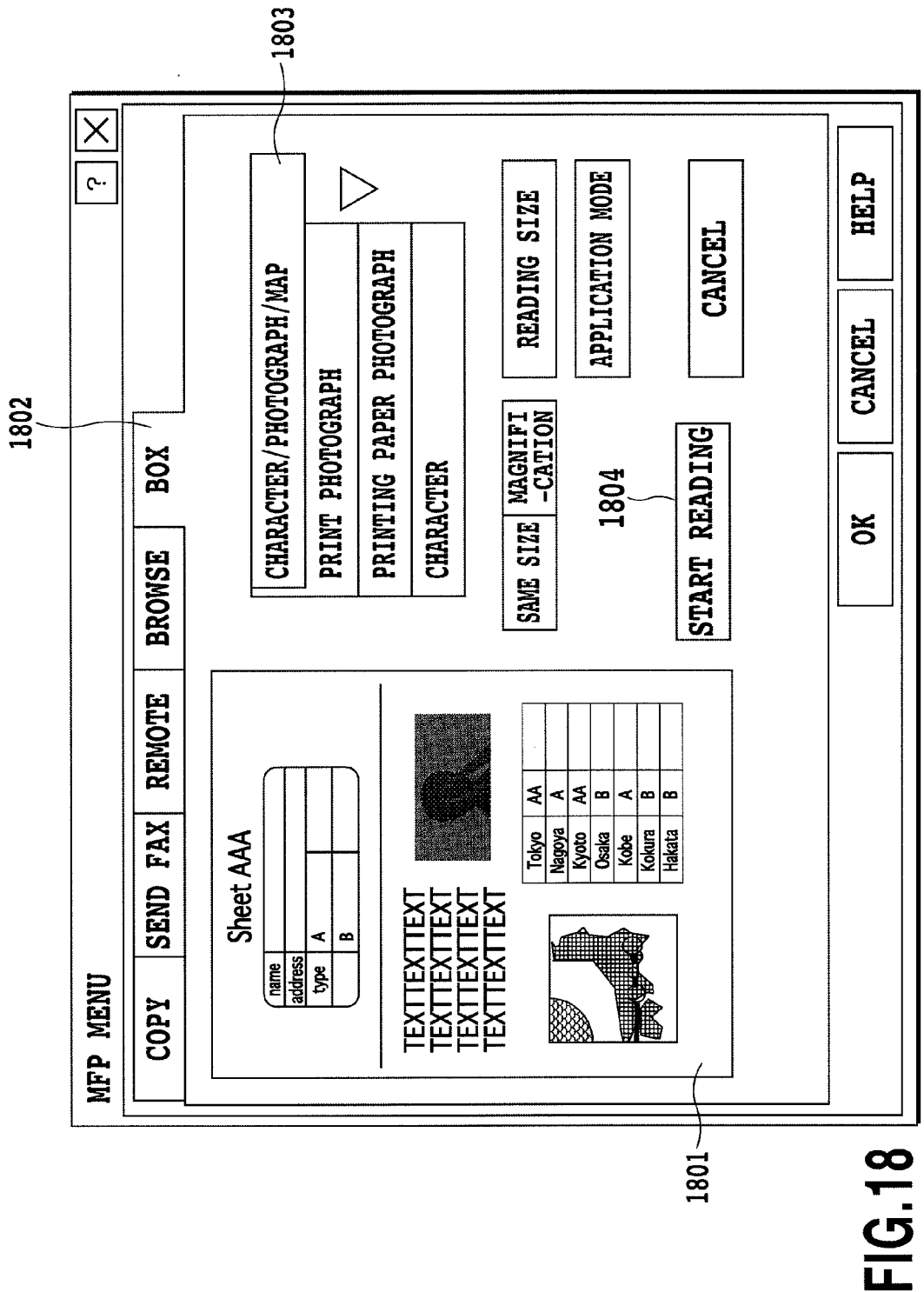
FIG. 18 is an illustration showing an example of a UI display when performing the BOX storage in the embodiment.

FIG. 18 shows, especially a page display screen 1801 of the UI on which a document image is displayed on the basis of the stored document data. Here, it is possible to display a reduced image of raster image of the document, and display an image by using the above mentioned SVG. In other words, a whole page may be displayed on the basis of the above mentioned data. A tab 1802 is for selecting functions included in the MFP 100. The functions included in the MFP 100 such as a copy, transmission (FAX), remote operation, browsing, and BOX can be selected by using the tab. It is needless to show that the similar display can be performed for the other functions.

By using a section indicated by the reference numeral 1803 in FIG. 18, various document modes can be selected when reading a document. This is for selecting in order to switch an image processing depending on a document type, and a display selection can be performed for modes other than the modes shown above. By using the reading start button 1809, the scanner is operated and the document image is read. In this example, although the reading start button is provided in the UI screen, the reading of the document can be started by pressing a start button provided separately.

Figure 19:
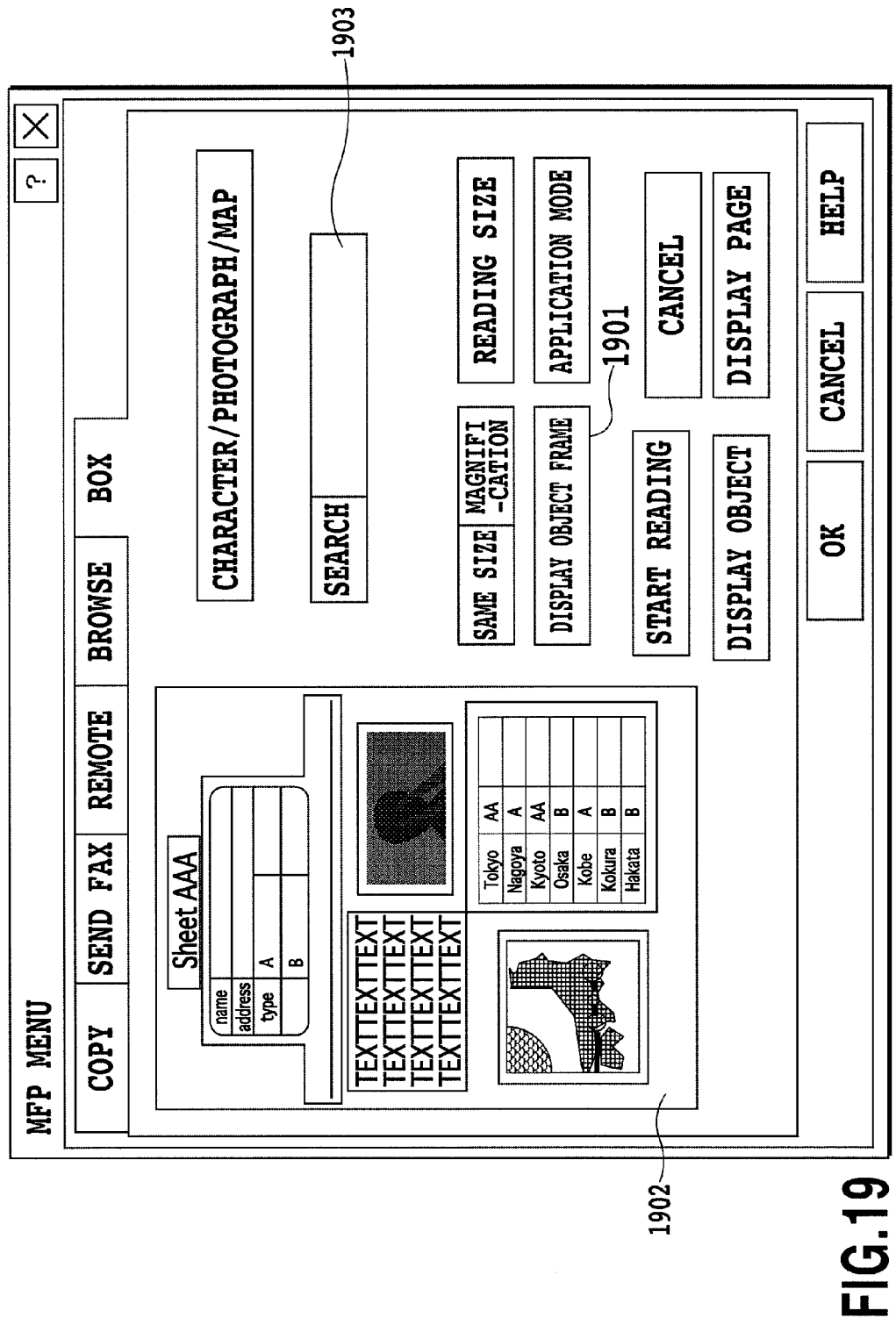
FIG. 19 is an illustration showing an example of a UI display when performing the BOX storage in the embodiment.

FIG. 19 illustrates a display screen on which each object in the document is surrounded by a frame so that the results of the object division can be identified. By pressing the object display button 1901 in FIG. 19, a frame of each object is displayed on the page display screen 1902. At this time, by coloring the frame, the difference of the objects can be seen on the display, and also by changing thickness of the line or changing type of the line such as a dotted line and a dashed line, the display is performed so that the difference of the objects can be seen. Here, as mentioned above, types of the objects are character, drawing, line drawing, table, photograph, and so on.

The reference numeral 1903 in FIG. 19 indicates a display section for inputting characters to perform a search. By inputting a search character string in this section and performing a search, a search target object or a page including the object is searched. Regarding a method of the search, by using the above described metadata provided to the object and using a known search method, the object or the page can be searched. The searched object or page is displayed on the UI.

Figure 20:
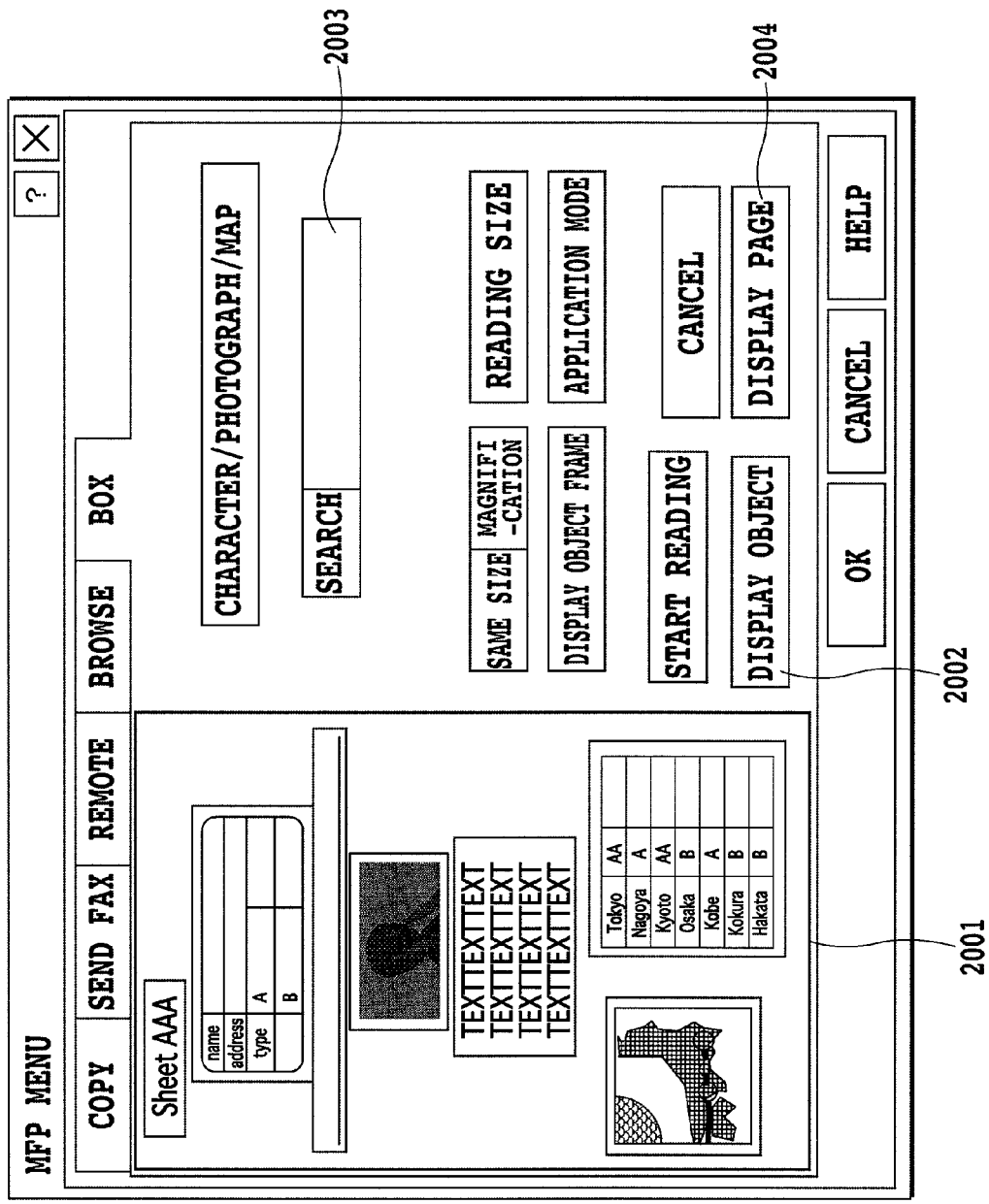
FIG. 20 is an illustration showing an example of a UI display when performing the BOX storage in the embodiment.

FIG. 20 shows a display screen on which objects in a page are displayed by pressing the object display button 2002. Here, the objects are not displayed based on a concept of page, but each object is displayed as a part as shown by reference numeral 2001. By pressing the page display button 2004, the display can be seen as an image of one page.

The reference numeral 2003 in FIG. 20 indicates a display section for inputting a search character string to perform a search. By inputting a search character string in this section and performing a search, a search target object or a page including the object is searched. Regarding a method of the search, by using the above described metadata provided to the object and using a known search method, the object or the page can be searched. The searched object or page is displayed on the UI.

Figure 21:
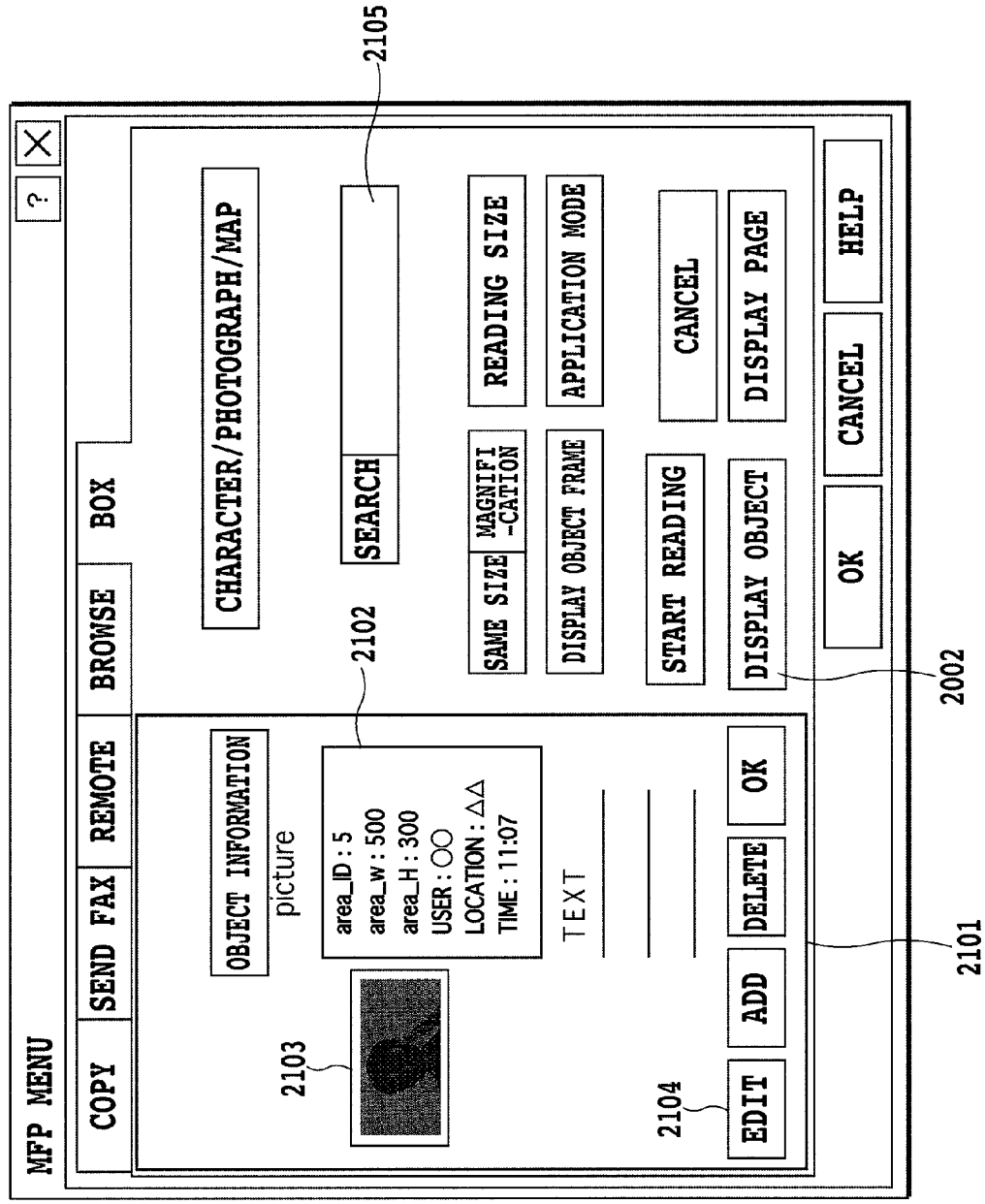
FIG. 21 is an illustration showing an example in which an object and meta information are displayed in a UI display when performing the BOX storage in the embodiment.

FIG. 21 is an example for displaying metadata of an object on the UI. When a certain object is selected, as shown by the reference numeral 2101, the image 2103 of the object and the above described metadata 2102 are displayed. The metadata displayed here includes information such as area information, width, height user information, MFP 100 installation location information, and input time.

In this example, the selected object is an object having a picture (photograph) attribute. Only a noun is extracted from the character recognition result of an object located near this object by using the morphological analysis, and displayed. This noun corresponds to the character string "TEXT" shown in the figure. An editing, addition, and deletion can be performed on the metadata by a button operation as shown by the reference numeral 2104.

The reference numeral 2105 in FIG. 21 is a display section for inputting characters to perform a search. By inputting a search character string in this section and performing a search, a search target object or a page including the object is searched. Regarding a method of the search, by using the above described metadata provided to the object and using a known search method, the object or the page can be searched. The searched object or page is displayed on the UI.

As described above, the object division processing, the vectorization processing, and the OCR processing are performed not only on the image data read by the image reading apparatus, but also on the image data formed by rasterizing the PDL data. Since the metadata is generated based on the result of the OCR processing as described above, a format of stored document data can be the same. At the same time, it is possible to solve the following problems which occur when extracting character codes from a character object in the PDL data to use the character codes as metadata. Specifically, the following problems can be solved:

Character codes cannot be obtained when the internally held data is Path data or image data, even though the data looks like text data.

Meaningless data is obtained only from the character codes.

A meaningful text data cannot be obtained by the morphological analysis after the character recognition when a character string of an original text is divided into single characters to be a drawing command.

Second Embodiment

In the above described first embodiment, an example in which when the PLD data is stored in the HDD used as the BOX, a normal rendering is performed and the OCR processing is performed on a result of the rendering is described.

When performing the OCR processing, if a special decorated character or a special font is used for the character data, it can be considered that a character recognition accuracy of the OCR processing will be insufficient. Therefore, in this embodiment, an example in which, especially for the BOX storage of the PDL data, to further improve the accuracy of the OCR processing, a rendering dedicated to the OCR processing is performed is described.

Figure 22:
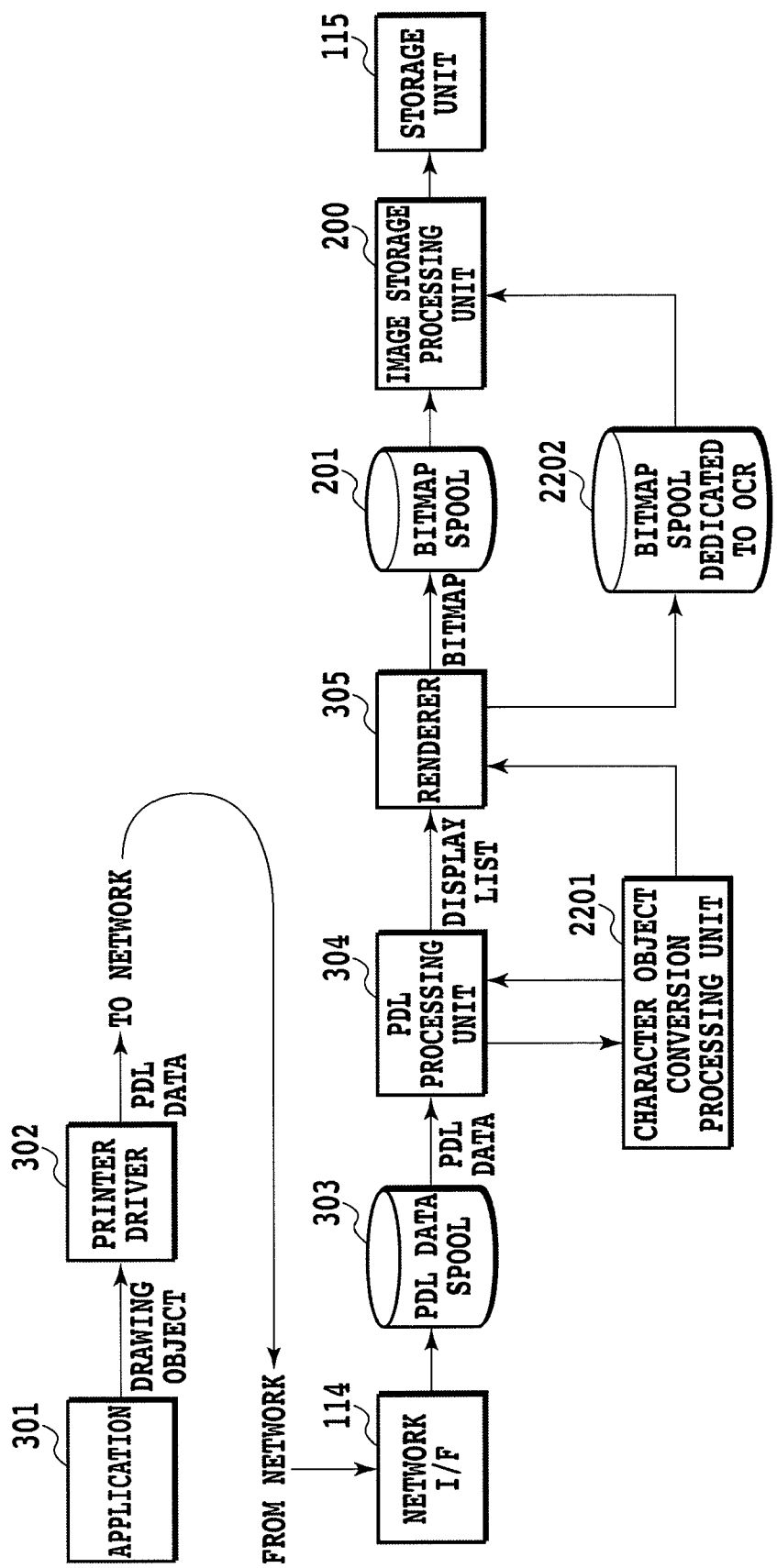
FIG. 22 is an illustration showing a process flow of each processing block when performing a BOX storage processing for the PDL data in a second embodiment.

In this embodiment, when the BOX storage of the PDL data is instructed to the MFP 100 from the driver UI 600, the MFP 100 operates according to a process flow of processing blocks shown in FIG. 22.

As shown in FIG. 22, the PDL processing unit 304 further includes a character object conversion processing unit 2201. The renderer 305 further includes a path for performing a normal rendering and storing an image in the Bitmap spool 201 and a configuration for performing a rendering dedicated to the OCR processing and storing the image data in a Bitmap spool 2202 dedicated to OCR. The other processing blocks are the same as the first embodiment as described by using FIG. 4. However, in this embodiment, the configuration of the image storage processing unit 200 and a total process flow are different from the above described first embodiment.

Hereinafter, by using FIGS. 23 and 24, a detailed configuration of the image storage processing unit 200 and a process flow of the image data storage processing in this embodiment will be described.

Figure 23:
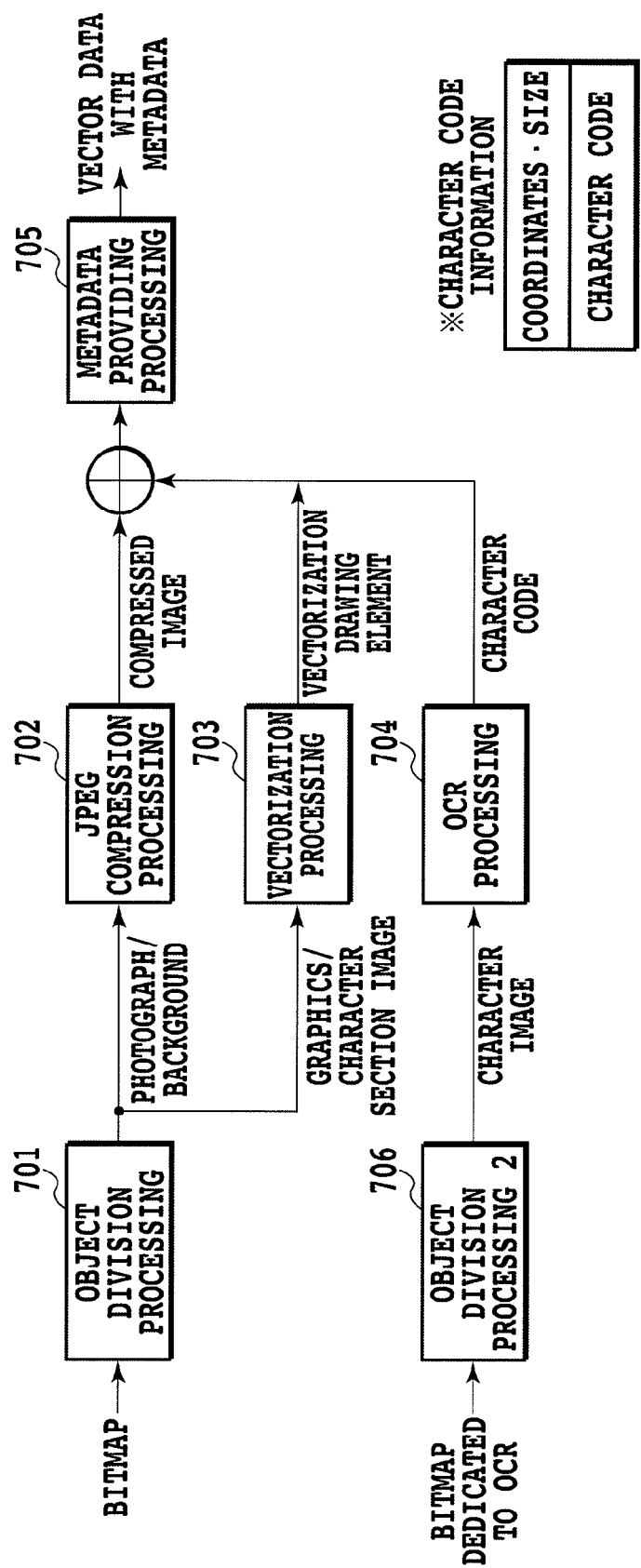
FIG. 23 is a block diagram illustrating a configuration of an image storage processing unit of the embodiment.
Figure 24:
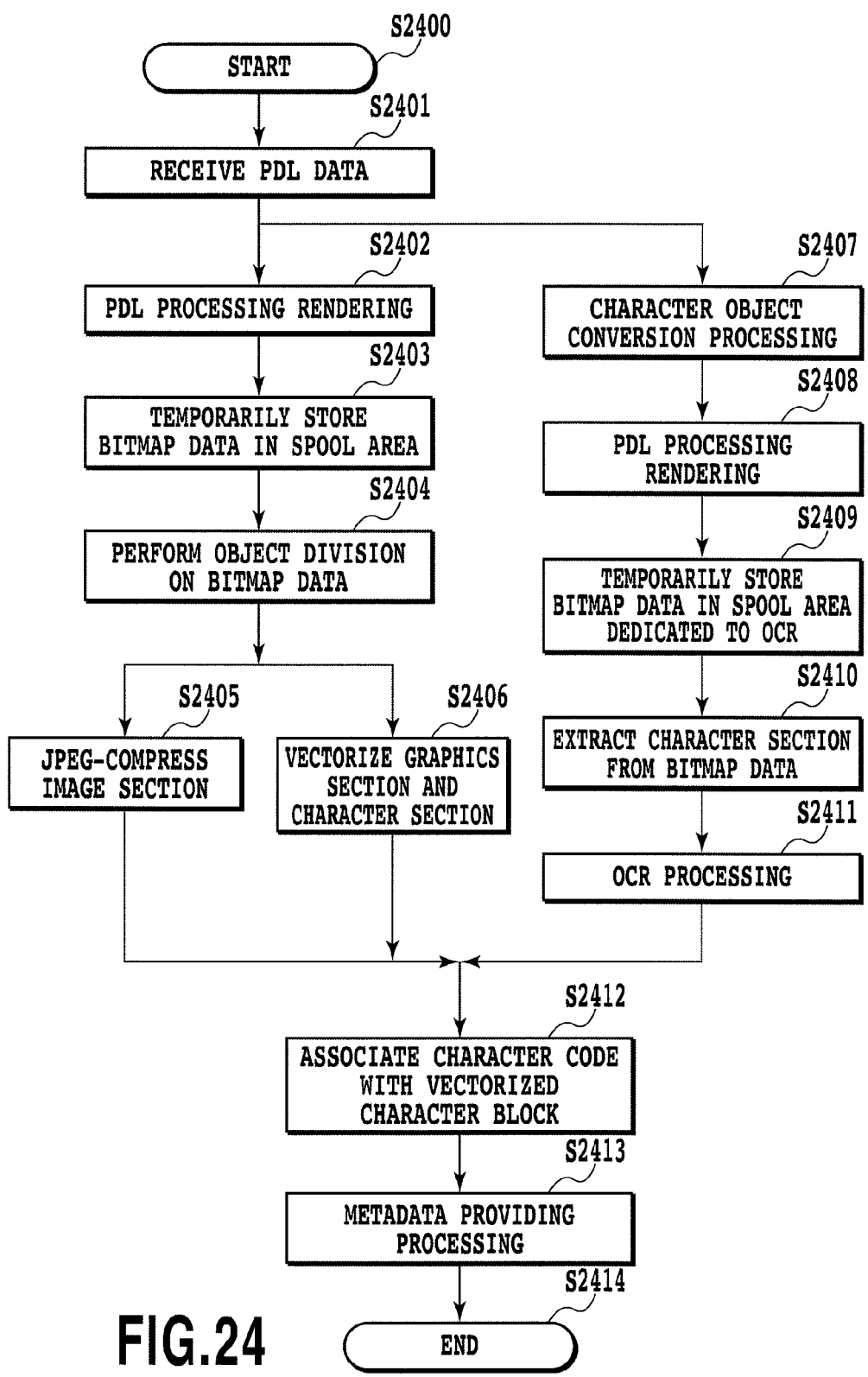
FIG. 24 is a flowchart illustrating a process flow of the BOX storage processing in the embodiment.

FIG. 23 is a block diagram illustrating a configuration of the image storage processing unit 200 in this embodiment, and FIG. 24 is a flowchart illustrating a process flow of the PDL data storage processing.

In the image storage processing unit 200, as shown in FIG. 23, the object division processing 2 unit 706 directly accepts an output from the Bitmap spool 2202 dedicated to OCR. In this unit, although the same processing as the object division processing unit 701 may be performed, especially a processing for extracting only character image block is performed. The character image block determined by the object division processing 2 unit 706 is processed by the same processing as that of the first embodiment in the OCR processing unit 704, and character code information is extracted.

Although the object division is performed also in the object division processing unit 701 in the same way as the first embodiment, the information and image data of the character block are processed only in the vectorization processing unit 703 in this embodiment. The processing results of the JPEG compression processing unit 702, the vectorization processing unit 703, and the OCR processing unit 704 are integrated for each object, and inputted into the metadata providing processing unit 705. The metadata is provided in the metadata providing processing unit 705, and stored in the HDD used as the BOX.

Next, an example of a process flow when performing the BOX storage by these processing blocks is shown in a flowchart of FIG. 24, and further details will be described.

The MFP 100 starts processing after receiving an instruction of the BOX storage of the PDL data according to an instruction of the driver UI 600 on the client PC 102 (S2400).

In step S2401, the PDL data is received via the network I/F 114, and stored in the PDL data spool 303.

Next, the stored data is retrieved and processed by the processing blocks of the PDL processing unit 304 and the rendering unit 305 in step S2402.

Next, in step S2403, the Bitmap data after processing is stored in the Bitmap spool 201. Thereafter, the process moves to the image storage processing unit 200. Specifically, in step S2404, the object division is performed on the Bitmap data by the object division processing unit 701.

Furthermore, in step S2405, a bitmap image portion of the Bitmap data is JPEG-compressed, and in step S2406, a processing by the vectorization processing unit 703 is performed on a graphics portion and a character portion.

Figure 25:
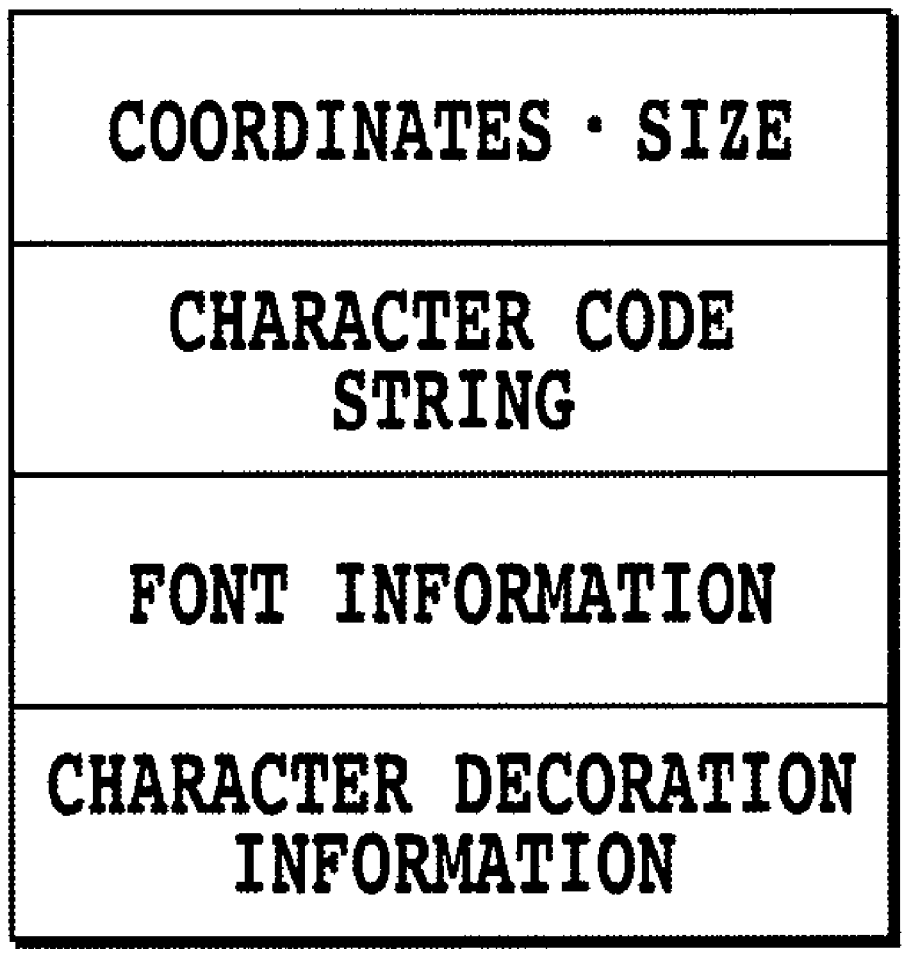
FIG. 25 is an illustration showing a representation example of a character object in the embodiment.

On the other hand, a processing by the character object conversion processing unit 2201 is performed on the PDL data (S2407). In this embodiment, the character object is represented by a form as shown in FIG. 25, and constituted by coordinates and size of the object, character code string, font information, and character decoration information.

In the character object conversion processing unit 2201, the font information (i.e. the font type and font size) is converted into generalized data which can be easily handled by the OCR processing. By (doing so, various types of fonts which the OCR processing has to handle are integrated into one type. Therefore it is possible to improve the accuracy of the OCR processing which has a possibility that the accuracy decreases when there are many font types. The character object conversion processing unit 2201 operates to cancel the character decoration information such as italic and bold. By doing so, it is possible to prevent deterioration of the accuracy of the OCR processing, although the accuracy deteriorates when the OCR processing processes various types of character decorations.

Figure 26:
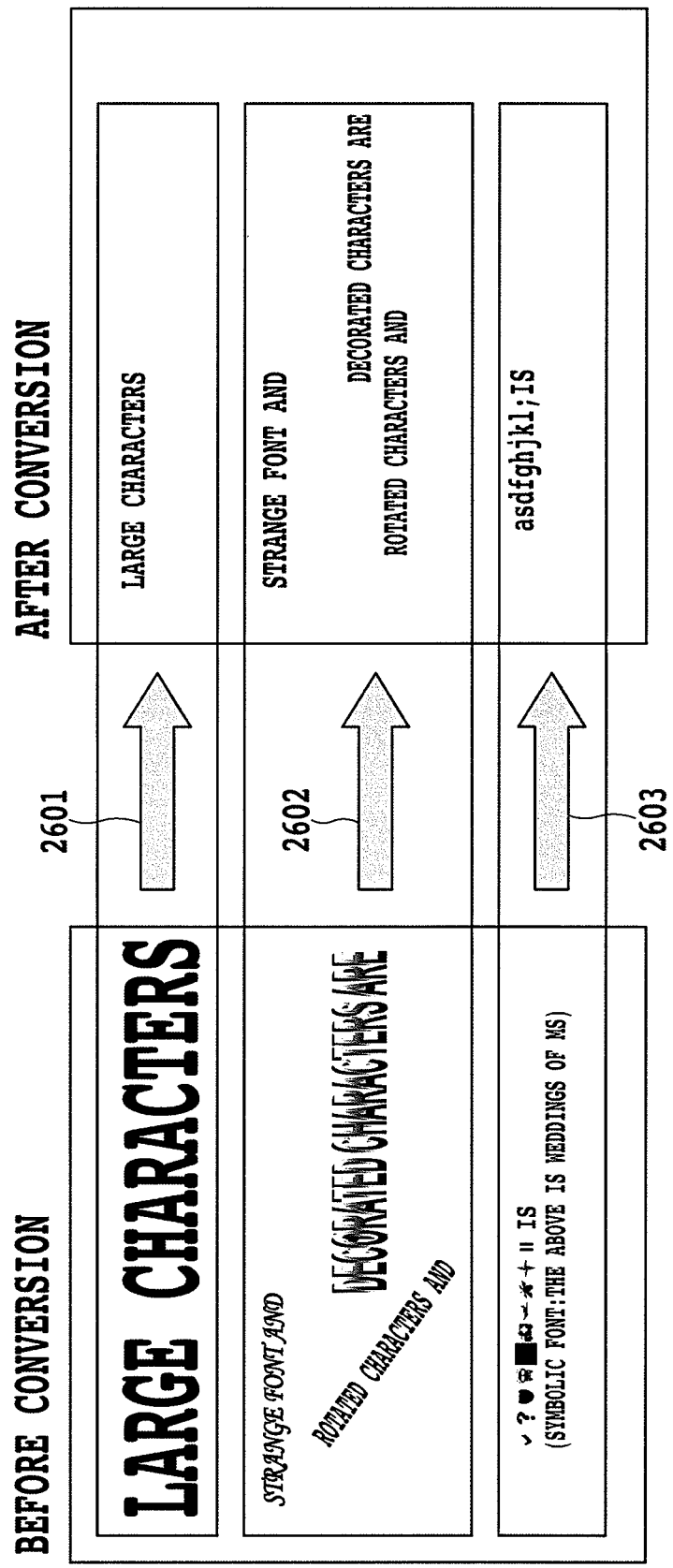
FIG. 26 is an illustration explaining a character object conversion processing in the embodiment.

In addition, the PDL data which has been converted in the character object conversion processing unit 2201 is used only for the OCR processing, and does not affect the image recorded by the image recording apparatus 113 and the image displayed on the UI screen. Therefore, as shown in FIG. 26, these outputs become character elements seen completely different from the character elements before the conversion.

As shown by reference numeral 2601, regarding a character which is too large to be recognized easily by the OCR, or a character which may be processed as path data, it is possible to improve a character recognition rate of the OCR processing by reducing the size of the character in advance.

As shown by reference numeral 2602, there are characters which are difficult to be recognized by the OCR processing because the characters are of a special font, decorated, or rotated. Or there are characters which may be processed as image data. For such characters, it is possible to improve the character recognition rate of the OCR processing by cancelling the character decoration information in advance and unifying the font types and sizes of the characters.

As shown by reference numeral 2603, regarding an object which becomes meaningful visual information only after being rendered by using a combination of character code and font, the character codes are found to be meaningless as language information by unifying fonts. By doing so, since the characters are processed as a meaningless word in the morphological analysis when providing metadata on the basis of the OCR processing result, it is possible to prevent providing meaningless metadata.

The PDL data converted as described above is processed by the PDL processing and the rendering in step S2408.

The generated Bitmap data is stored in the Bitmap spool 2202 dedicated to OCR in step S2409.

In step S2411, the OCR processing unit 704 retrieves data from the Bitmap spool 2202 dedicated to OCR and performs the OCR processing to output character codes.

In step S2412, the character code information and the vectorized data are integrated. In step S2413, the metadata providing processing is performed and the metadata is stored in the HDD used as the BOX.

The above processing is performed to complete the entire process (S2414).

Execution timings of the normal Bitmap rendering and the rendering of the Bitmap dedicated to OCR are approximately the same in the process flow of this embodiment. However, since image data can be held in two Bitmap spools separately, the timings may not be the same. For example, it is possible to perform a standby control in which the Bitmap data dedicated to OCR is created by the rendering and stored, and the OCR processing and the image storage processing are performed on the Bitmap data when the CPU of the MFP 100 has free time between processings.

Third Embodiment

In the above described first embodiment and the second embodiment, an example in which the metadata is provided by using data obtained from the result of the OCR processing as the character code information is described. Especially, in the second embodiment, a configuration in which the Bitmap data dedicated to OCR is generated to improve the accuracy of character recognition is described. In this embodiment, an example in which reliability of the character code information is improved by parallel use of the character code information obtained by the OCR processing and the character code information directly extracted from the PDL data is described by using FIGS. 27 to 29.

Figure 27:
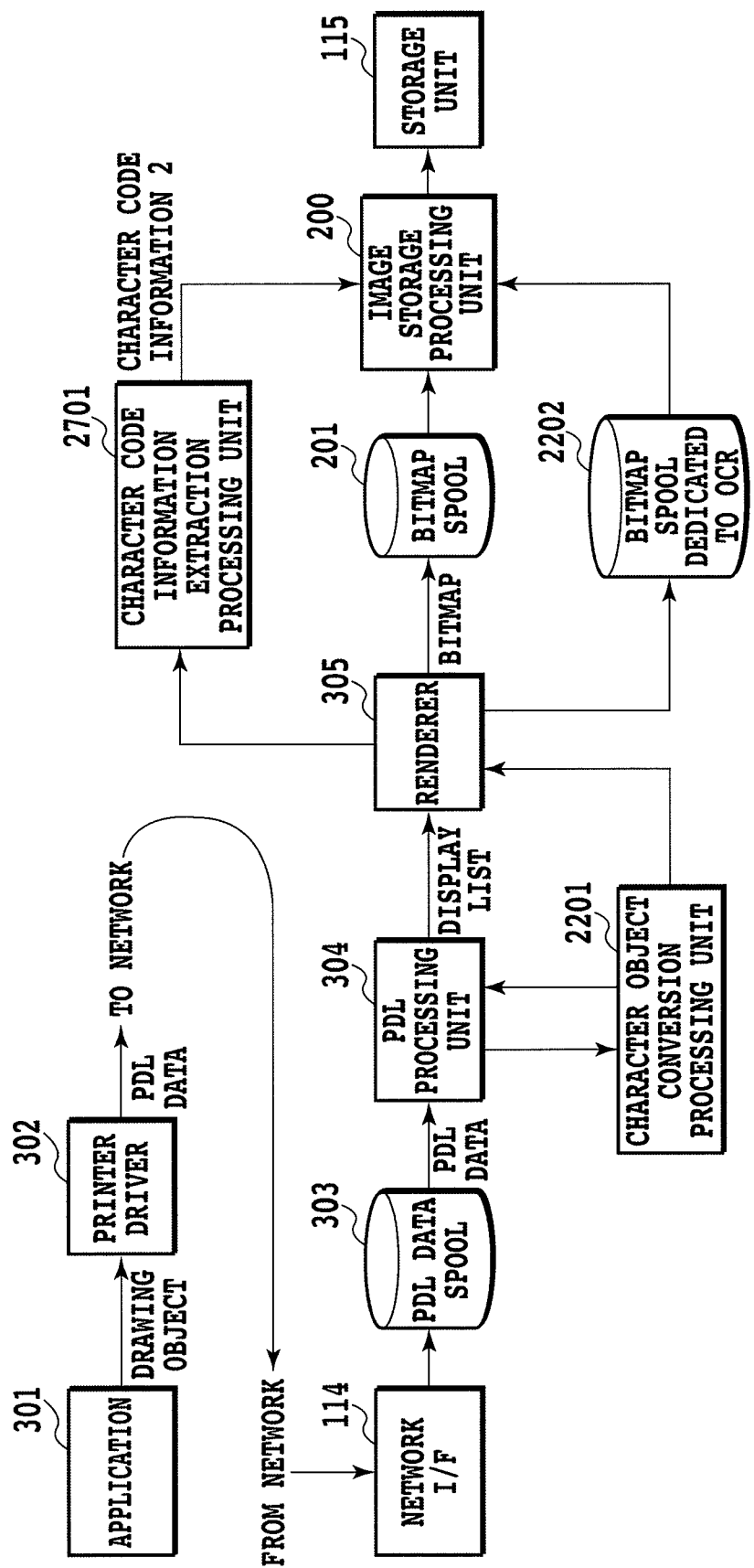
FIG. 27 is an illustration showing a process flow by processing blocks when performing the BOX storage processing on the PDL data in a third embodiment.
Figure 28:
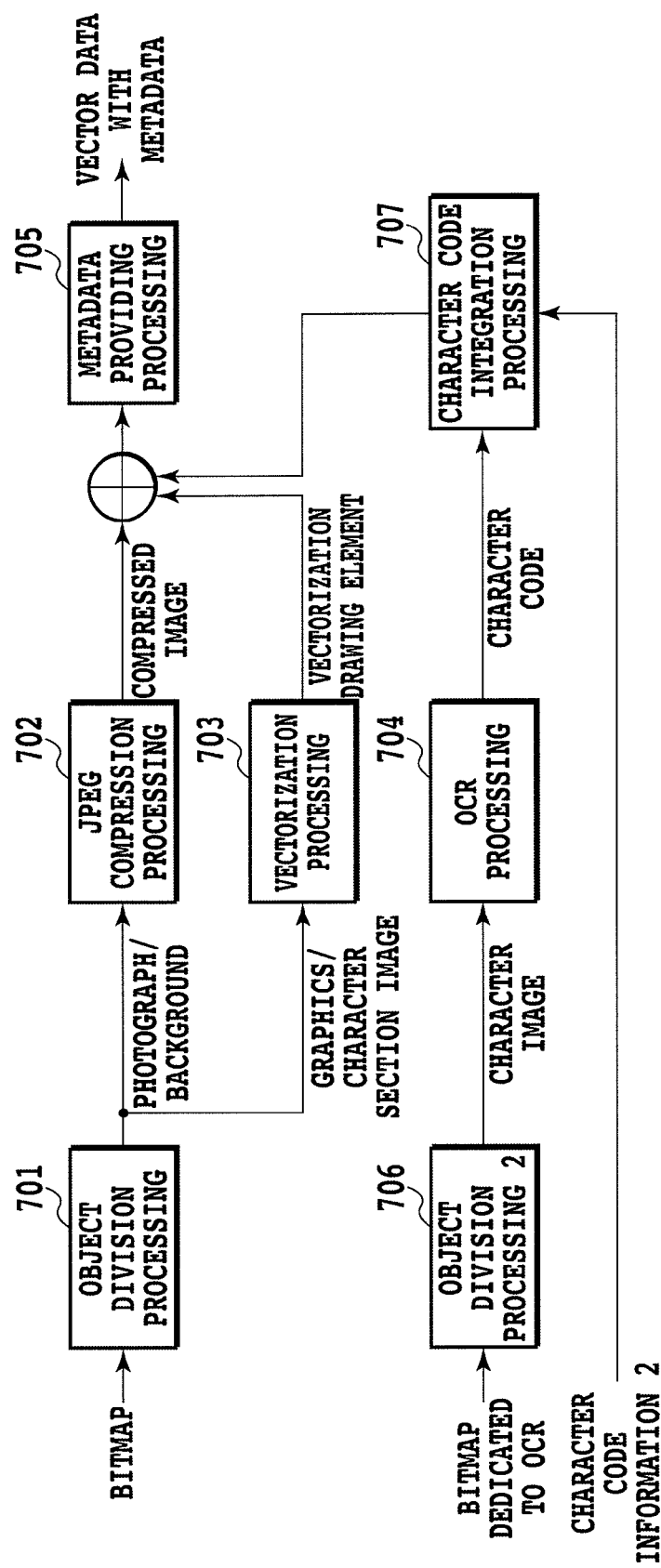
FIG. 28 is an illustration showing a configuration of the image storage processing unit 200 of the embodiment.
Figure 29:
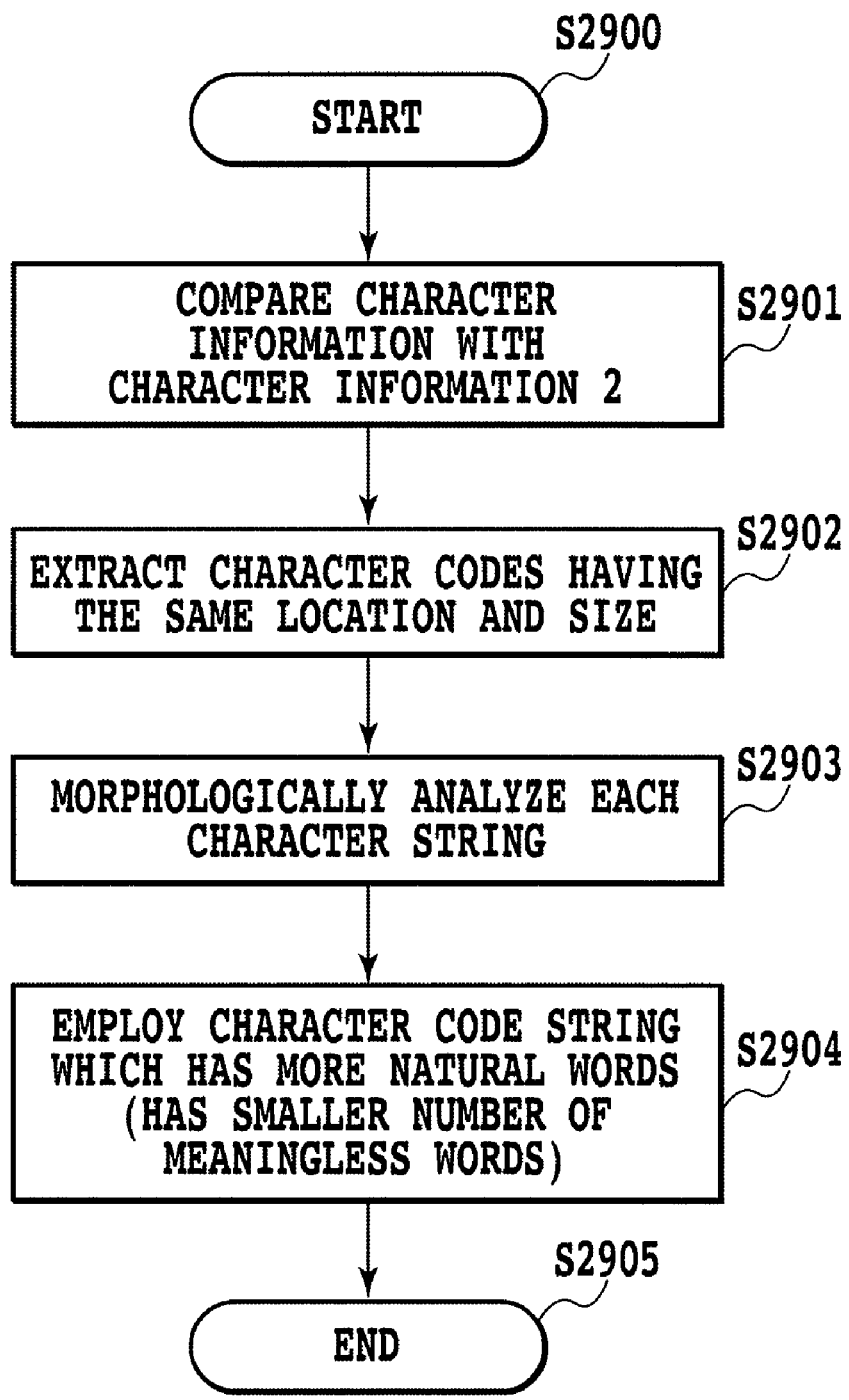
FIG. 29 is a flowchart illustrating an example of a process flow performed by a character code information integration processing unit 707 in the embodiment.

FIG. 27 is an illustration showing a process flow by processing blocks when performing the BOX storage processing on the PDL data in this embodiment. FIG. 28 is an illustration showing a configuration of the image storage processing unit 200 of the same embodiment. FIG. 29 is a flowchart illustrating an example of a process flow performed by a character code information integration processing unit 707.

In this embodiment, as shown in FIG. 27, a character code information extraction processing unit 2701 which performs a processing for extracting character codes from Display List information transferred to the renderer 305 is added. The character code information extraction processing unit 2701 of this embodiment extracts the coordinates/size information and the character code information from the character object information shown in FIG. 25, and transfers the extracted information to the image storage processing unit 200. Although the other processing blocks shown in FIG. 27 are the same as the corresponding processing blocks shown in FIG. 22 used for the description of the second embodiment, they also may be the same as the corresponding processing blocks shown in FIG. 7 used for the description of the first embodiment.

As shown in FIG. 28, the image storage processing unit 200 further includes a character code information integration processing unit 707 which directly receives character code information 2, and integrates the character code information 2 and the character code information obtained by the processing of the OCR processing unit 704.

Here, details of the processing performed by the character code information integration processing unit 707 will be described by using FIG. 29.

When the character code information integration processing is started (S2900), in step S2901, a correspondence relationship between the character code information obtained by the processing of the OCR processing unit 704 and the character code information 2 extracted by the character code information extraction processing unit 2701 is checked.

Next, in step S2902, character code information which is at approximately the same position and has approximately the same size is extracted.

Next, in step S2903, the morphological analysis is performed on character code strings included in each character code information.

In the result of the morphological analysis in step S2904, character code information having fewer meaningless words is employed to be outputted (S2904).

By performing the above processing, reliability of obtained character code information can be improved.

Regarding a rule which determines which code is outputted, the following rule can be considered. Specifically, when a character object is broken down to single characters and transferred as PDL data, the character code information 2 includes data of single characters, so that the result of the morphological analysis will be meaningless. Therefore, it is possible to make a rule in which character code information having a longer character code string is employed.

Fourth Embodiment

The processing by the character object conversion processing unit 2201 introduced in the MFP 100 in the above described third embodiment may be performed by the printer driver.

Figure 30:
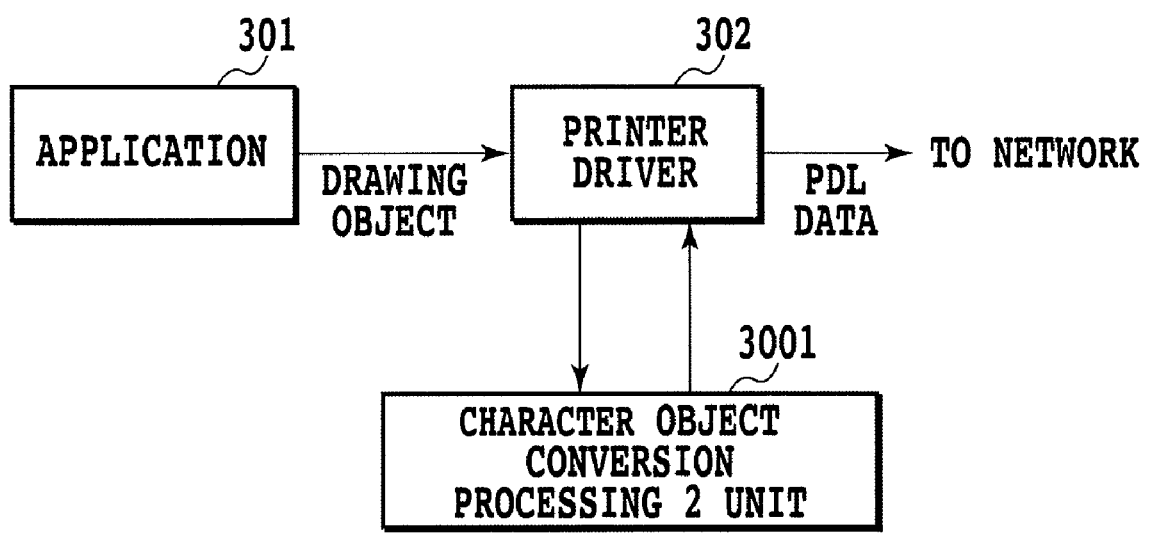
FIG. 30 is an illustration showing a configuration example for the character object conversion processing in a fourth embodiment.

FIG. 30 illustrates an example in which a character object conversion processing 2 unit 3001 is added in the configuration of the client PC 102. The character object conversion processing 2 unit 3001 performs the same processing as the character object conversion processing unit 2201.

When the BOX storage of the PDL data is instructed on the driver UI 600, the PDL data transmitted from the printer driver 302 is normal PDL data on which the character object conversion is not performed. Next, the rendering dedicated to OCR is performed, and the PDL data on which the character object conversion is performed is transmitted.

In the MFP 100, when the first PDL data is received from the printer driver 302, it is controlled so that image data is developed in the normal Bitmap spool 201. When the second PDL data is received, it is controlled so that the PDL data is developed in the Bitmap spool 2202 dedicated to OCR.

Regarding the processing after the image data is developed in the normal Bitmap spool 201 and the Bitmap spool 2202 dedicated to OCR, the same processing as that described in the second embodiment or the third embodiment may be performed.

In this embodiment, the character object conversion processing unit 2201 connected to the PDL processing unit 304 is not necessarily to be required.

According to the configuration of this embodiment, cases in which original text data is changed to image data or path data by the processing of an application and the printer driver in the client PC 102 can be reduced. Therefore, it is possible to contribute to the solution of the problem that "character codes cannot be obtained when the internally held data is Path data and image data, even though the data looks like text data".

Other Embodiments

Figure 31:
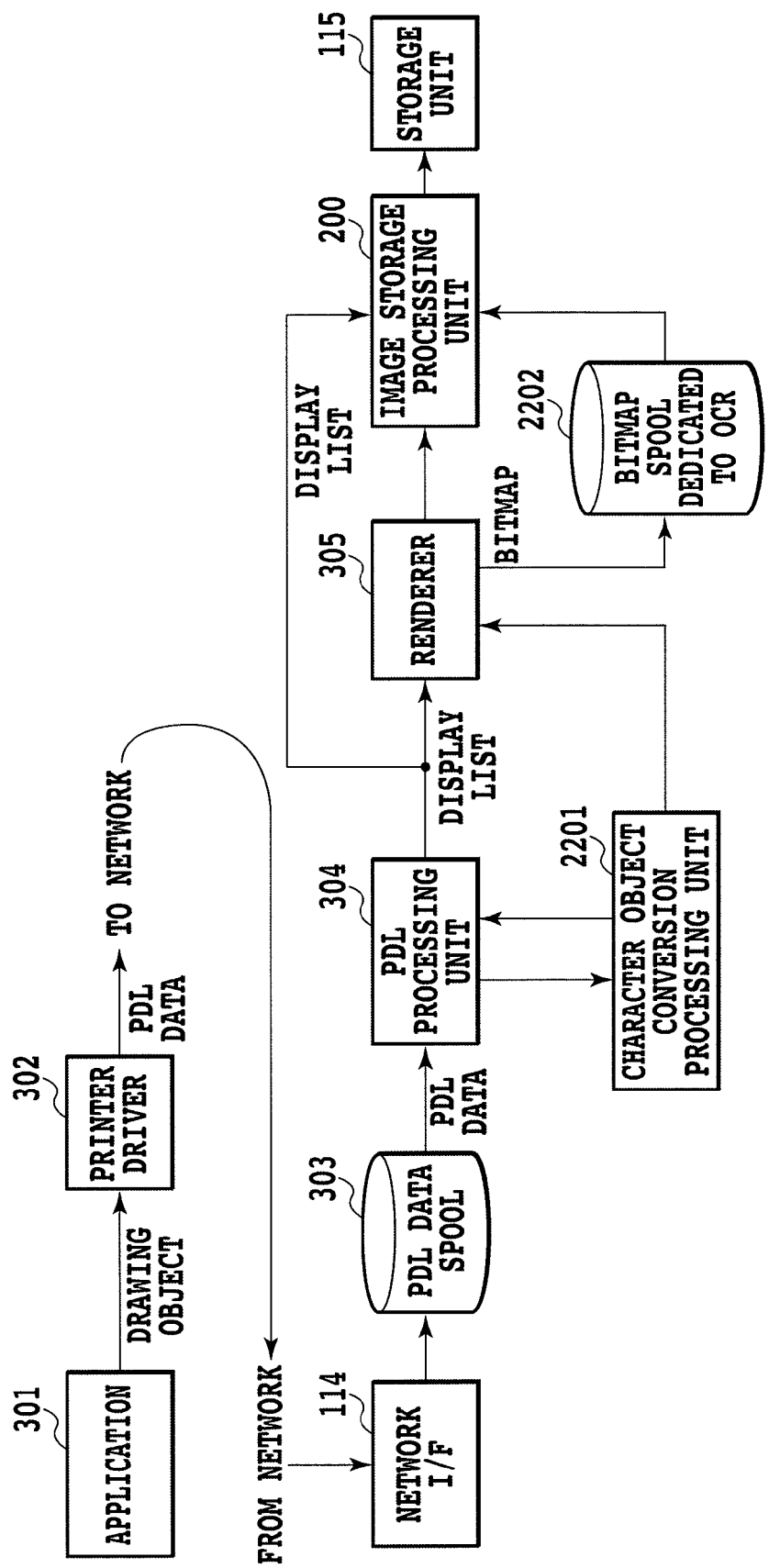
FIG. 31 is an illustration showing a process flow of each processing block when performing the BOX storage processing for the PDL data in another embodiment.

In the above described first to fourth embodiments, it is described that when the PLD data is stored in the HDD used as the BOX, the image data rendered from the PDL data is processed by the object division processing, and further processed by the vectorization processing, the JPEG processing, and the OCR processing. However, as shown in FIG. 31, the Display List information generated by the PDL processing unit 304 may be transferred to the image storage processing unit 200 without change.

At this time, the MFP 100 controls so that the Display List information generated from the PDL data which is not processed by the character object conversion processing is transferred to the image storage processing unit 200 without change. The PDL data which is processed by the character object conversion processing is controlled to be rendered by the renderer 305 as Bitmap data dedicated to OCR.

Figure 32:
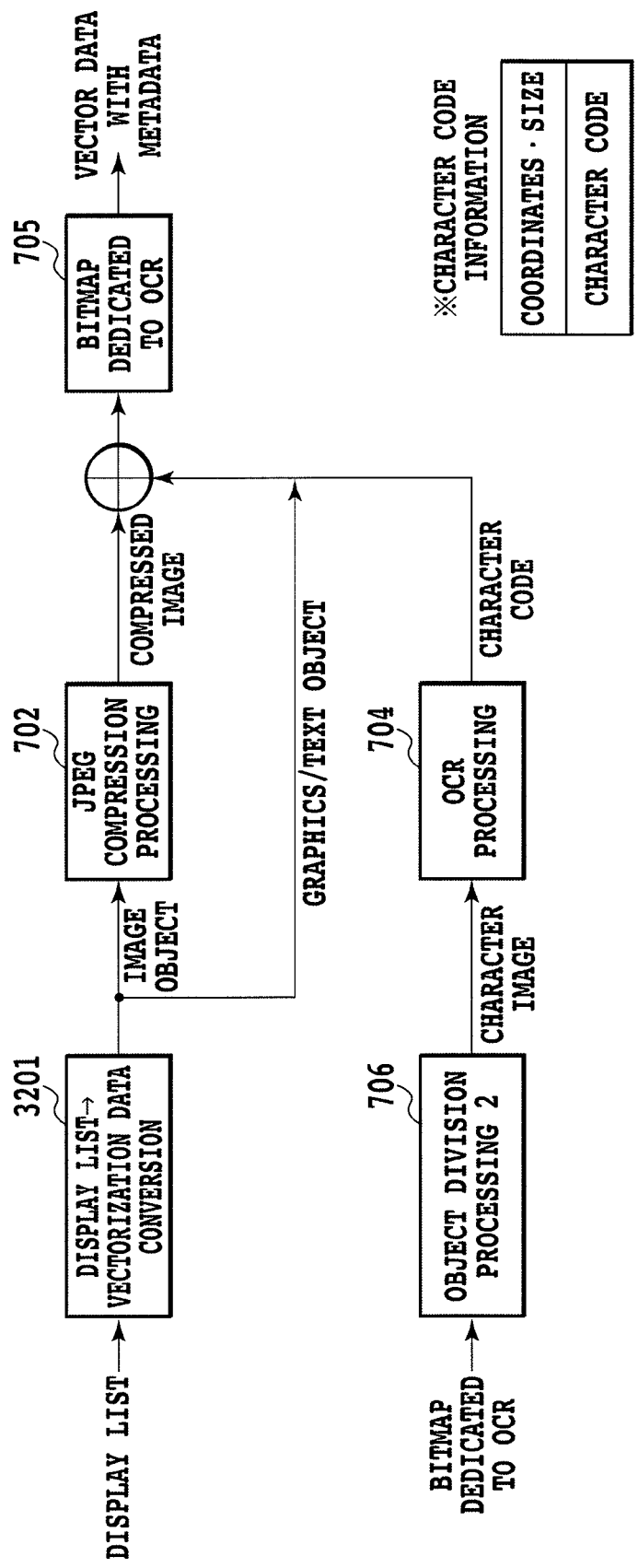
FIG. 32 is an illustration showing a configuration of the image storage processing unit 200 of the embodiment.

As shown in FIG. 32, the image storage processing unit 200 controls so that the inputted Display List is directly converted into SVG data in a unit indicated by reference numeral 3201. Originally, on the Display List, Bitmap Image object, Graphics object, and Character object are processed by the object division processing. Since the Graphics object is represented by vector, a certain level of direct conversion is possible.

On the other hand, aside from this, a processing by the OCR processing unit 704 is performed on a character image area obtained by the object division processing 2 unit 706 from the Bitmap data dedicated to OCR. And then, the character code information is extracted and the metadata providing processing is performed as described in the first to fourth embodiments.

As described above, also in this embodiment, it is possible to effectively solve the problems when extracting character codes from a character object in the PDL data and using the character codes as an index for search, and provide an image processing apparatus performing a reliable document storage.

Various embodiments of the present invention have been described hereinbefore.

The object of the present invention is also achieved when a computer (or CPU or MPU) of the system or the apparatus reads a program code realizing the process of the flowcharts shown in the above embodiments from a storage medium in which the program code is stored, and executes the program code. In this case, the program code itself read from the storage medium realizes the functions of the above described embodiments on the computer. Therefore, the program code and the computer-readable storage medium in which the program code is stored/recorded are included in the present invention.

As the storage medium for providing the program code, for example, a floppy (registered trademark) disk, a hard disk, an optical disk, a magneto-optical disk, a CD-ROM, a CD-R, a magnetic, tape, a nonvolatile memory card, a ROM, and the like can be used.

The functions of the above described embodiments are realized by reading and executing the program by the computer. The execution of the program includes a case in which OS and the like running on the computer performs all or a part of the actual processing based on an instruction of the program.

In addition, the functions of the above described embodiments can also be realized by a function expansion board inserted in the computer or a function expansion unit connected to the computer. In this case, first, the program read out from the storage medium is written into a memory provided in the function expansion board inserted in the computer or the function expansion unit connected to the computer. Thereafter, a CPU provided in the function expansion board or the function expansion unit performs all or a part of the actual processing based on an instruction of the program. The functions of the above described embodiments are also realized by a processing of the function expansion board or the function expansion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-179204, filed Jul. 9, 2008, which is hereby incorporated by reference herein in its entirety.

What is claimed is:

1. An image processing apparatus comprising:
a first rendering component configured to store first image data obtained by rendering first PDL data into a first rendering buffer;
a converting component configured to obtain second PDL data by converting at least any one of coordinates information, size information, font information, and decoration information of a character object included in the first PDL data;
a second rendering component configured to store second image data obtained by rendering the second PDL data into a second rendering buffer;
an extracting component configured to extract a character object from the second image data stored in the second rendering buffer;
a character recognizing component configured to obtain character code information by performing character recognition processing on the character object extracted by the extracting component;
a metadata providing component configured to provide metadata including the character code information obtained by the character recognizing component to the first image data stored in the first rendering buffer.

2. An image processing apparatus comprising:
a rendering component configured to obtain image data by rendering PDL data;
an extracting component configured to extract a character object from the image data obtained by the rendering component;
a character recognizing component configured to obtain character code information by performing character recognition processing on the character object extracted by the extracting component;
a character code extracting component configured to extract second character code information from the character object extracted by the extracting component;
an integration component configured to compare the character code information obtained by the character recognizing component and the second character code information extracted by the character code extracting component, and configured to employ the more reliable character code information in accordance with the comparison result; and
a metadata providing component configured to provide metadata including the more reliable character code information employed by the integration component to the image data.

3. The image processing apparatus according to claim 2, wherein, in the comparison of character code information, the image processing apparatus compares results of morphological analysis performed on each character code information, and employs the character code information having a smaller number of meaningless words as the metadata in accordance with the comparison result.

4. The image processing apparatus according to claim 1, further comprising a vectorizing component configured to convert an object included in the first image data into vector data,
wherein the metadata providing component provides the metadata including the character code information obtained by the character recognizing component to the vector data of the object in the image data converted by the vectorizing component.

5. An image processing system in which an image processing apparatus and a host computer including a printer driver having a function for receiving drawing information from an application and transmitting first PDL data converted based on the drawing information to the image processing apparatus are connected via a network,
wherein the printer driver has a converting component configured to obtain second PDL data by converting at least any one of coordinates information, size information, font information, and decoration information of a character object included in the first PDL data, and
wherein the image processing apparatus comprises:
a receiving component configured to receive the first PDL data and the second PDL data from the host computer;
a first rendering component configured to store first image data obtained by rendering the first PDL data into a first rendering buffer;
a second rendering component configured to store second image data obtained by rendering the second PDL data into a second rendering buffer;
an extracting component configured to extract a character object from the second image data stored in the second rendering buffer;
a character recognizing component configured to obtain character code information by performing character recognition processing on the character object extracted by the extracting component; and
a metadata providing component configured to provide metadata including the character code information obtained by the character recognizing component to the first image data stored in the first rendering buffer.

6. An image processing method comprising:

a first rendering step for storing first image data obtained by rendering first PDL data into a first rendering buffer;

a converting step for obtaining second PDL data by converting at least any one of coordinates information, size information, font information, and decoration information of a character object included in the first PDL data;

a second rendering step for storing second image data obtained by rendering the second PDL data into a second rendering buffer;

an extracting step for extracting a character object from the second image data stored in the second rendering buffer;

a character recognizing step for obtaining character code information by performing character recognition processing on the character object extracted by the extracting step; and a metadata providing step for providing metadata including the character code information obtained by the character recognizing step to the first image data stored in the first rendering buffer.

7. A non-transitory computer-readable storage medium storing a computer program, the computer program causing a computer to execute the steps of:

a first rendering step for storing first image data obtained by rendering first PDL data into a first rendering buffer;

a converting step for obtaining second PDL data by converting at least any one of coordinates information, size information, font information, and decoration information of a character object included in the first PDL data;

a second rendering step for storing second image data obtained by rendering the second PDL data into a second rendering buffer;

an extracting step for extracting a character object from the second image data stored in the second rendering buffer;

a character recognizing step for obtaining character code information by performing character recognition processing on the character object extracted by the extracting step; and a metadata providing step for providing metadata including the character code information obtained by the character recognizing step to the first image data stored in the first rendering buffer.

* * * * *